Nov. 22, 1938.　　　A. A. CLOKEY ET AL　　　2,137,603
STOCK QUOTATION BOARD SYSTEM
Filed Nov. 13, 1930　　10 Sheets-Sheet 1
FIG. I
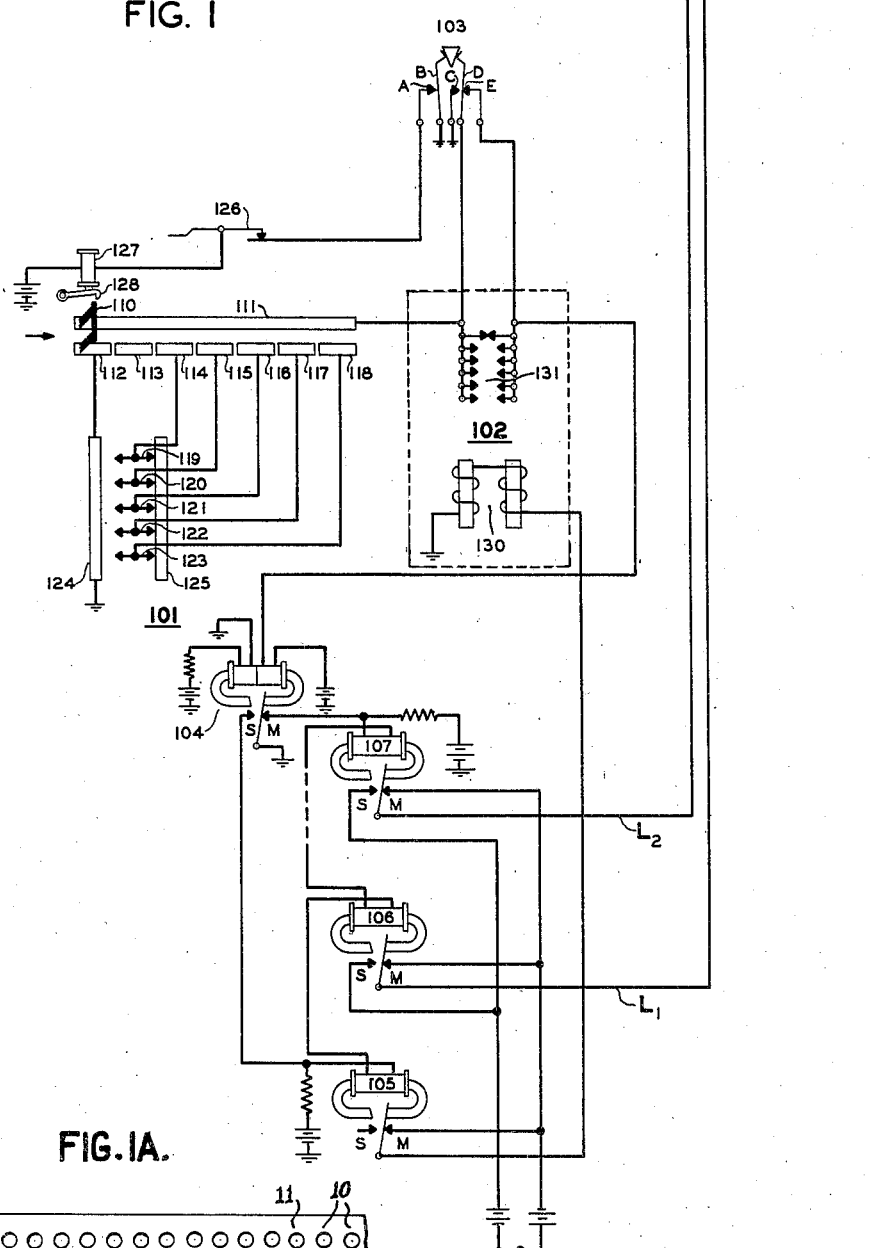
FIG. IA.
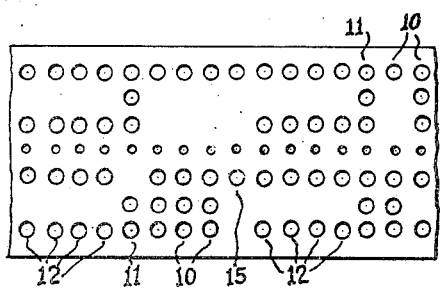
INVENTORS
ALLISON A. CLOKEY
GILBERT S. VERNAM
BY R. C. Hopgood
ATTORNEY

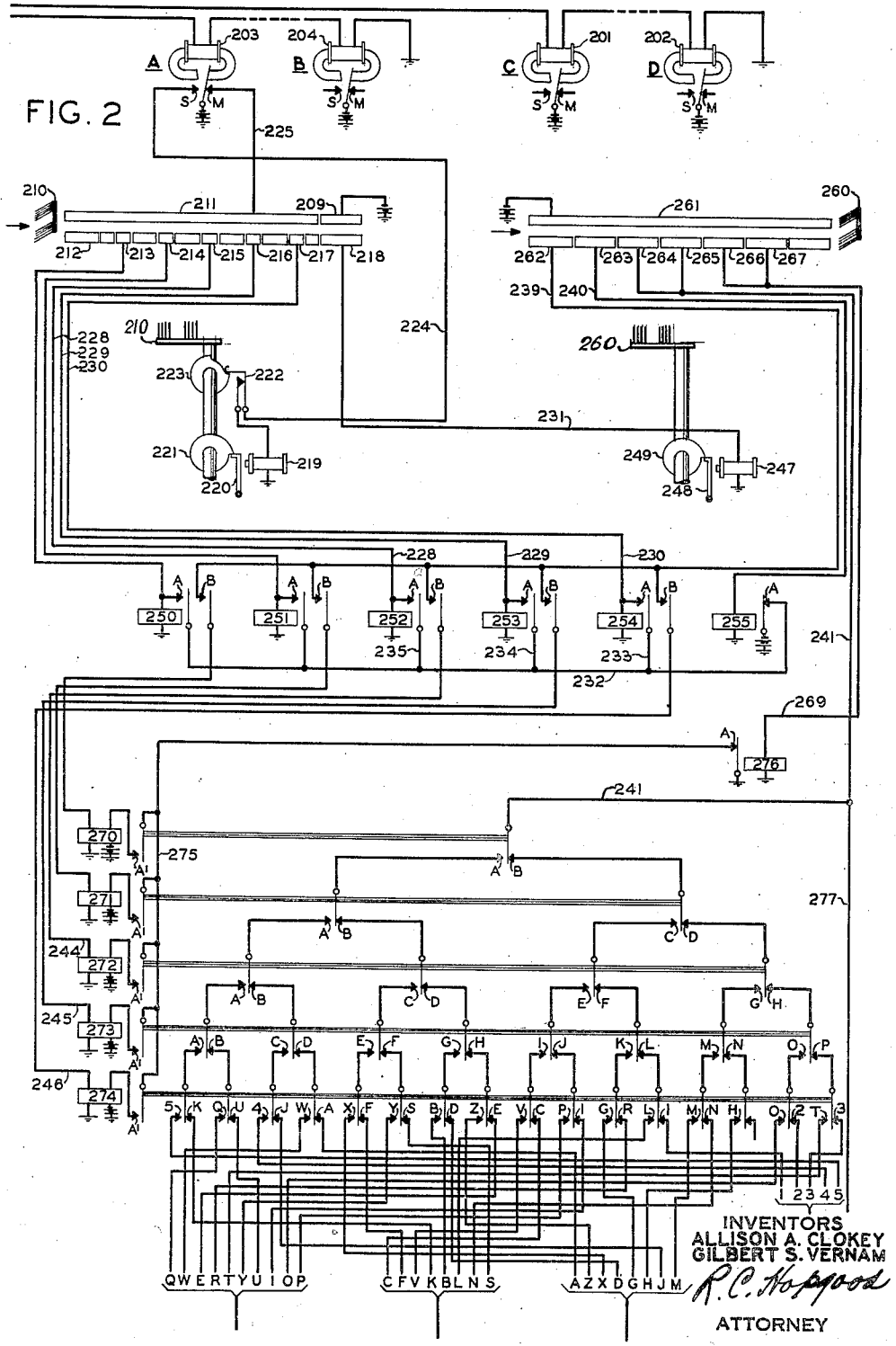

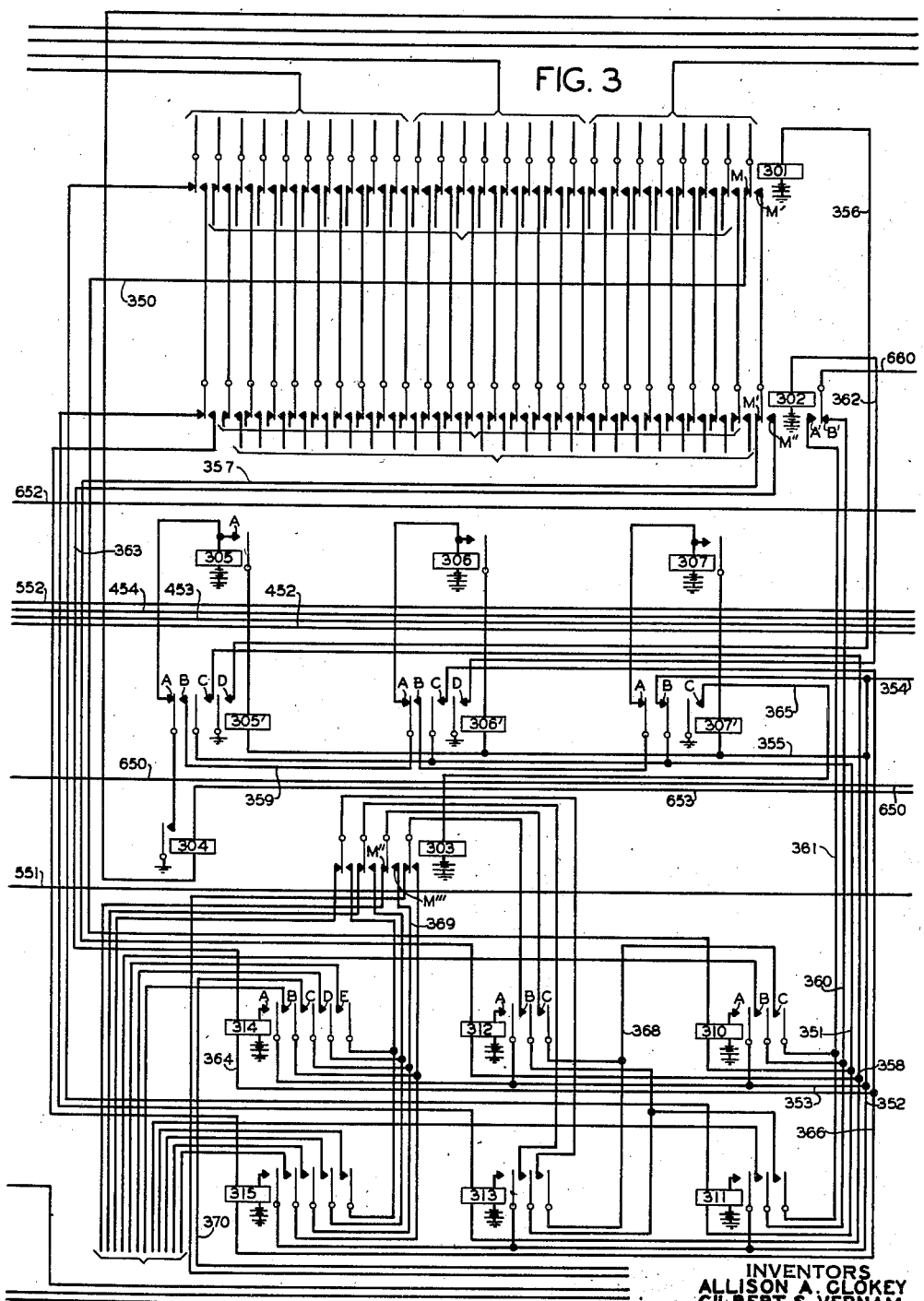

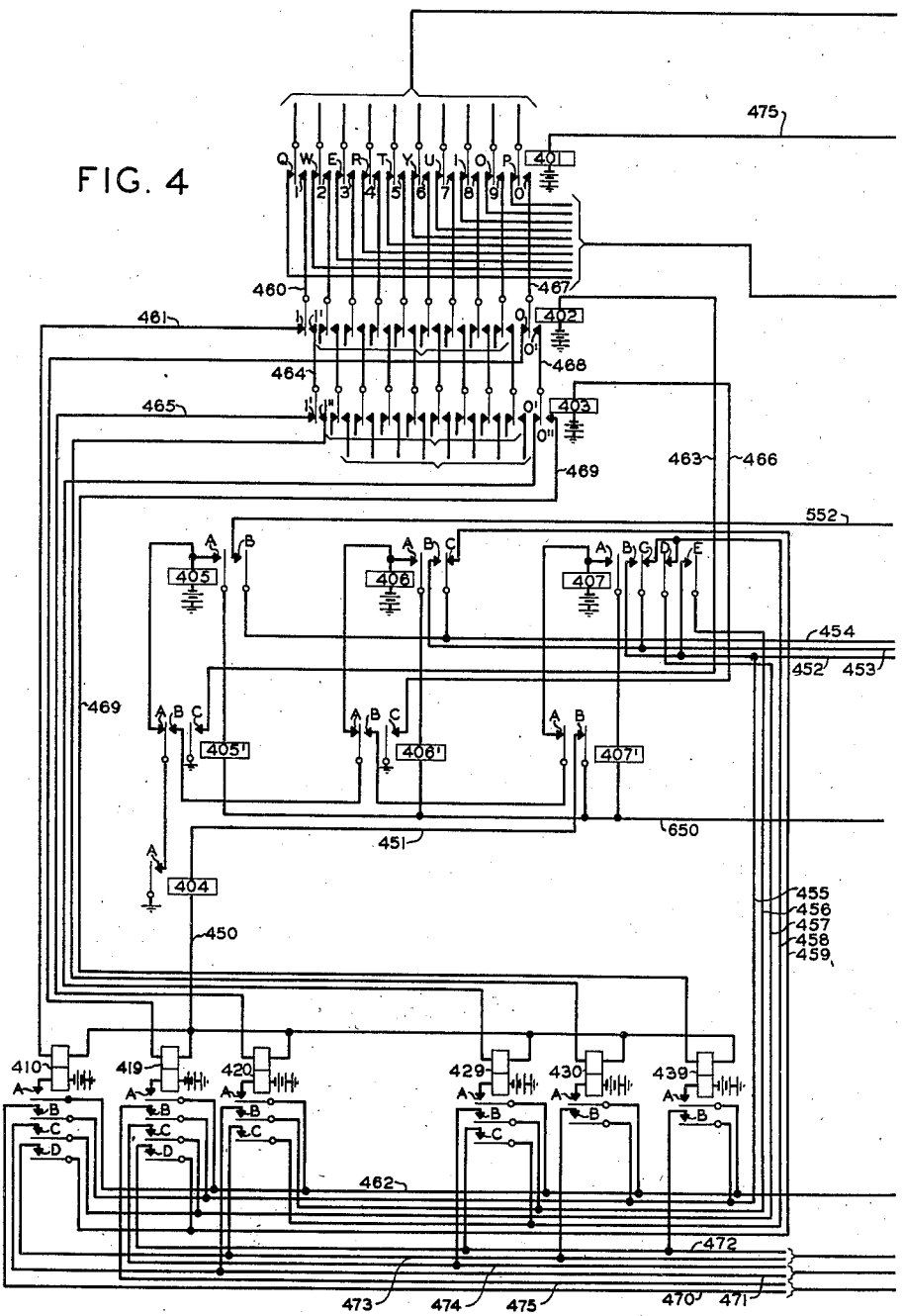

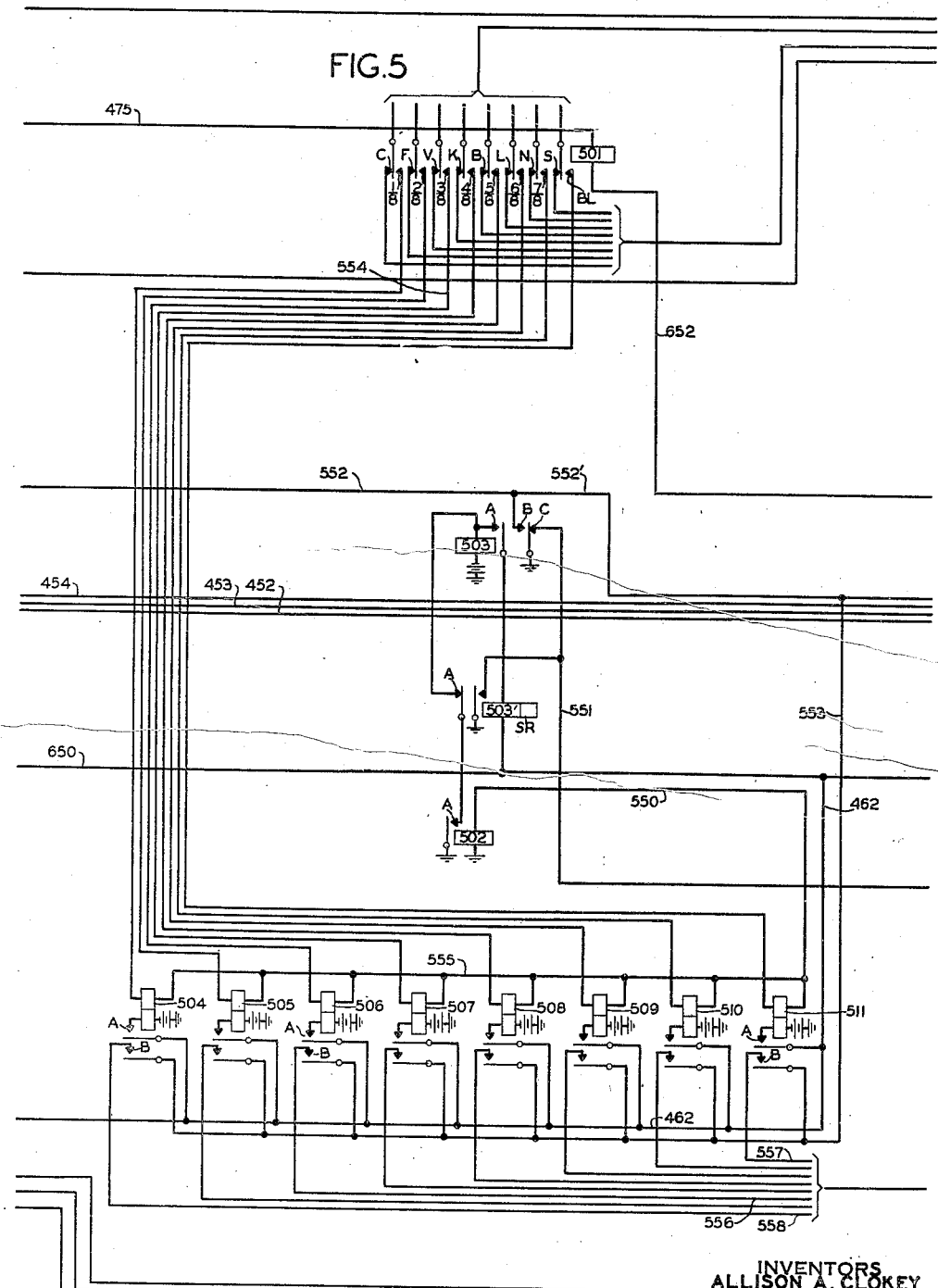

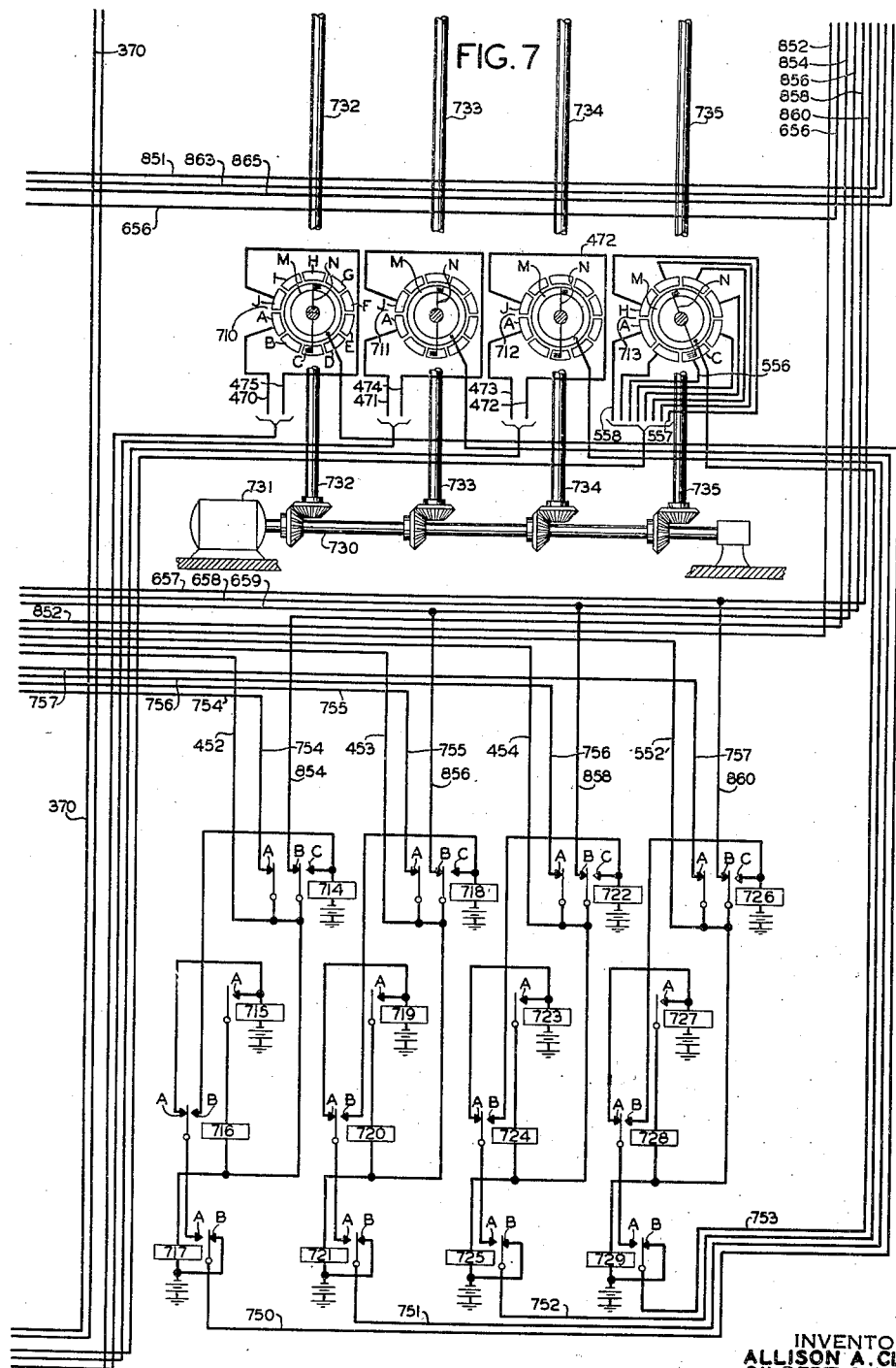

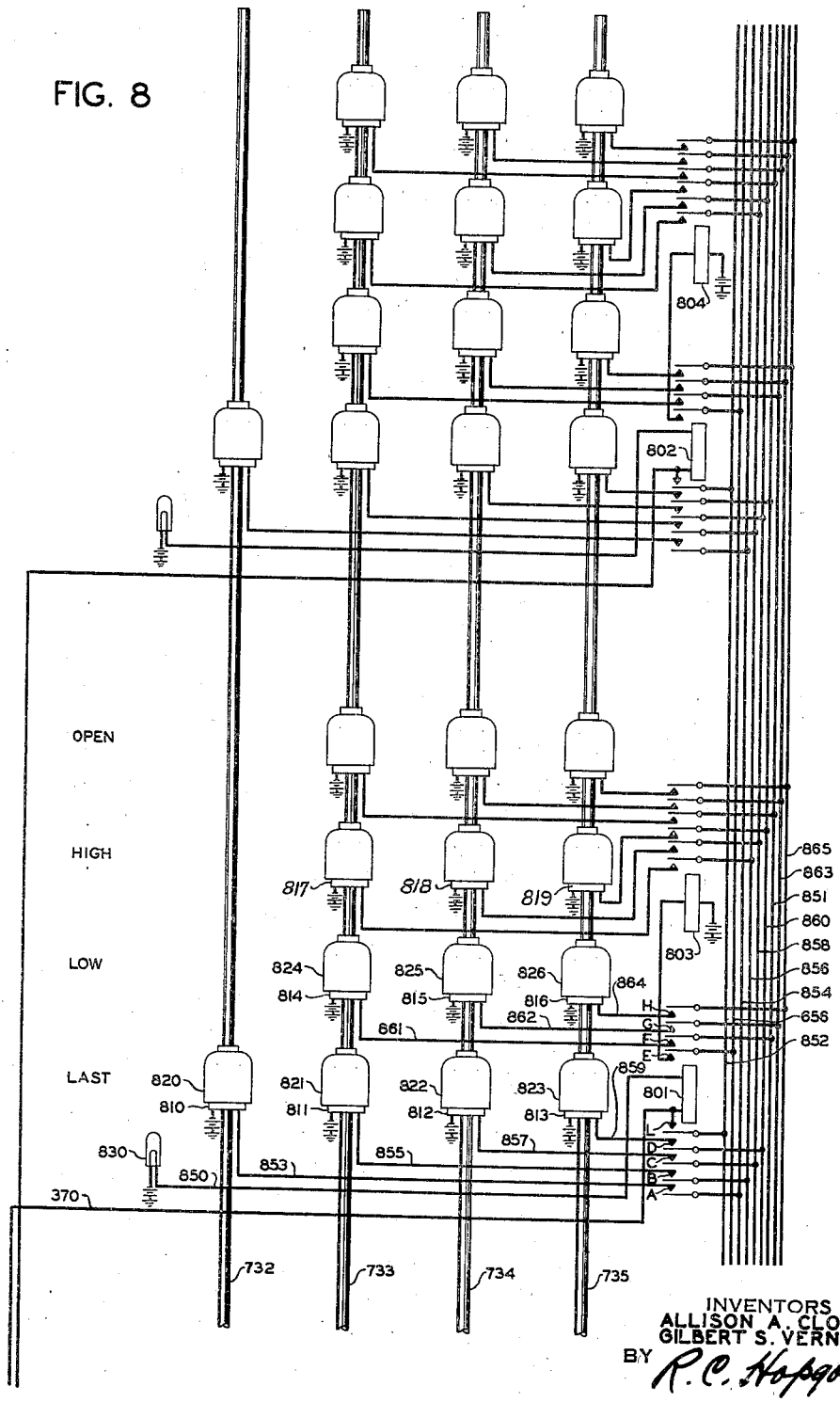

Nov. 22, 1938.　　A. A. CLOKEY ET AL　　2,137,603
STOCK QUOTATION BOARD SYSTEM
Filed Nov. 13, 1930　　10 Sheets-Sheet 9

INVENTORS
ALLISON A. CLOKEY
GILBERT S. VERNAM
BY R. C. Hopwood
ATTORNEY

Nov. 22, 1938.                A. A. CLOKEY ET AL                    2,137,603
                          STOCK QUOTATION BOARD SYSTEM
                              Filed Nov. 13, 1930              10 Sheets—Sheet 10

INVENTORS
ALLISON A. CLOKEY
GILBERT S. VERNAM
BY R. C. Hopgood
ATTORNEY

Patented Nov. 22, 1938

2,137,603

UNITED STATES PATENT OFFICE 2,137,603

STOCK QUOTATION BOARD SYSTEM

Allison A. Clokey, Rutherford, and Gilbert S. Vernam, River Edge, N. J., assignors, by mesne assignments, to International Standard Electric Corporation, New York, N. Y., a corporation of Delaware Application November 13, 1930, Serial No. 495,370

15 Claims. (Cl. 177—353)

The present invention relates to automatic stock quotation boards and more particularly to such boards for use with an extensive network of signalling circuits.

In accordance with the invention the board includes a large number of register units designated by the symbol for the stock or commodity the prices of which are to be displayed thereon, each register unit being subdivided into a number of shelves for indicating the various prices commonly of interest as the open, high, low and last and each shelf including a plurality of registers for displaying the various orders of figures of the price.

With the present invention the standard stock exchange abbreviations are used whenever such abbreviations are combinations of one, two or three letters. The abbreviations are altered for use with the system when they contain more than three letters but since very few stocks, and these the least active, are so abbreviated, these alterations are infrequently necessary.

In the system herein disclosed, transmission takes place from a standard printing telegraph transmitter. This transmitter may be of either the "direct keyboard" or "tape transmission" type and may be operated either "start-stop" or "multiplex". Moreover, the transmitting device and, of course, the corresponding receiving mechanism may be adapted to use either the five-unit or Wheatstone or any one of a number of codes common in the printing telegraph art. Due to this, a standard keyboard is used and the common touch typing system may be employed by the operator.

In accordance with the present invention the price is transmitted in a straight forward manner, that is the figures of the highest order first and those of lower order consecutively thereafter. If for example, the price consisted of hundreds, tens, units and fractions figures, those figures would be transmitted in the order mentioned. If the price included merely units and fractions, the units figure would be transmitted first and the fractions digit thereafter. Moreover this is accomplished without making use of the difference between the new price and the preceding price and without restoring the registers to a normal position prior to setting them to display the new quotation.

The device used for reception of line signals is, as was stated, any one of a number of standard printing telegraph receivers requiring but a single channel of communication. The channel may be either a physical conductor or a multiplex or carrier current channel or a channel of any one of a number of other systems common in the communication art. Moreover, the transmitter may be connected in multiple to a number of channels so that a single transmitter will operate a number of receivers.

Moreover, the register drums or indicators of the embodiment herein disclosed, are driven, when selected, from a common driving means operating continuously and always in the same direction. Selected registers are operated in unison and upon attaining their correct positions are automatically released and stopped.

One of the objects of the invention is to provide a stock quotation board which may be controlled by a standard printing telegraph transmitter using a standard code, the transmission taking place over a single channel of communication.

Another object of the invention resides in the provision of means for transmitting the various figures of the price in their normal order, the figures of the highest order first and those of lower orders consecutively thereafter, without transmitting any figure of an order higher than that of the highest order figure the value of which is different in the new price and the next preceding price of the same stock. For example, if the new price be 210½ and the next preceding price 220½ the highest order of figures the value of which is different in the new price is the tens order. Consequently the figures transmitted are those of the tens order (1), units order (0) and fractions order (½), transmission of the hundreds order (2) being unnecessary. These figures are transmitted consecutively in order, the registration being changed thereby to 210½.

A further object of the invention resides in the provision of shelves of registers to indicate the open, high and low as well as the current prices and of means for selecting these shelves to operate registers thereof in unison with the respective selected registers of the current price group.

Another object of the invention resides in the provision for "overlap" whereby certain portions of the apparatus are used to store the stock and price selections; permitting a selected price to be posted while a new stock selection is being made.

A still further object of the invention resides in the provision for automatically releasing the various registers from the driving means when the selected positions of the registers have been reached.

Another object resides in the provision of a release relay so arranged that if the operator discovers an error in transmission at any time prior to the completion of the quotation, the selecting devices may be restored to normal; and subsequently the correct quotation may be transmitted without disturbing the prior registration of any of the registering units.

Broadly speaking, the system herein described contemplates transmission of signals from a central station to a number of receiving stations in ordinary five-unit code, using the start-stop printing system. These signals are received on a start-stop receiving distributor and operate a device hereinafter termed a permutation unit, which comprises five relays having their contacts so arranged that there are 32 possible circuits, each of which includes one contact of each relay. Thus, by operating different combinations of the five relays, different ones of the 32 circuits may be selected. Thus, when any letter or figure is transmitted, one of the 32 circuits is completed to operate one of a group of stock selecting relays.

In sending a quotation, the letters of the stock symbol are transmitted over the line. There may be from one to three of these letter symbols. They serve to complete from one to three circuits of the permutation unit in succession, operating the stock selecting relays and preparing a particular stock relay for operation.

Subsequently one of a group of "stunt" signals is transmitted. Reception of any signal of the group transfers the permutation unit circuits from the stock selection relay group to the price selection relay group, operates the selected stock relay and prepares the current shelf registers for operation. Certain of these "stunt" signals also serve to prepare for operation registers of other shelves.

Relays for performing these steps will be hereinafter referred to as stunt relays and the circuits associated with these relays will be referred to as stunt circuits.

Following the stock and shelf selections, a series of from one to four figure signals is transmitted. These signals again complete circuits through the permutation unit but are effective to operate the price selection relays.

When the fraction of the price has been sent, the selected price relays cause ground to be applied to a selected segment of one or more of each of four commutators. Also following the reception of the fraction, certain register clutch magnets (namely those prepared for operation by the operation of the selected stock and shelf relays) are energized and the associated register drums connected to a constantly rotating shaft. Then, after an amount of rotation depending on which commutator segments are grounded, the clutch magnets are released and the registers positioned to show the transmitted price.

The details of the stock selection and price selection circuits and of the construction of the novel registers used, as well as of other elements of the board, will be described more fully with the aid of the drawings, in which the first digit of any reference numeral is always the same as the number of the figure on which the reference numeral appears, making it unnecessary to refer to any part by both a reference character and a figure number. In the drawings:

Fig. 1 shows the transmitting arrangements for sending quotation signals to a number of receiving stations over a number of channels of communication.

Fig. 1A shows a section of specially prepared tape for use in setting the stock registers back to zero.

Fig. 2 shows a number of receiving relays which are located at a number of receiving stations, together with one of the receiving distributors and the associated permutation unit.

Fig. 3 shows the stock selection circuits including the various transfer and stock selection relays.

Fig. 4 shows the circuits for selecting the integers of the price.

Fig. 5 shows the circuits for selecting the fraction of the price.

Fig. 7 shows the register control relays, the register clutch magnet control commutators and the register drum driving motor and associated shafting.

Fig. 8 shows the stock relays and auxiliary shelf relays and groups of registers including the register clutch magnets and associated shafting.

Figure 6:
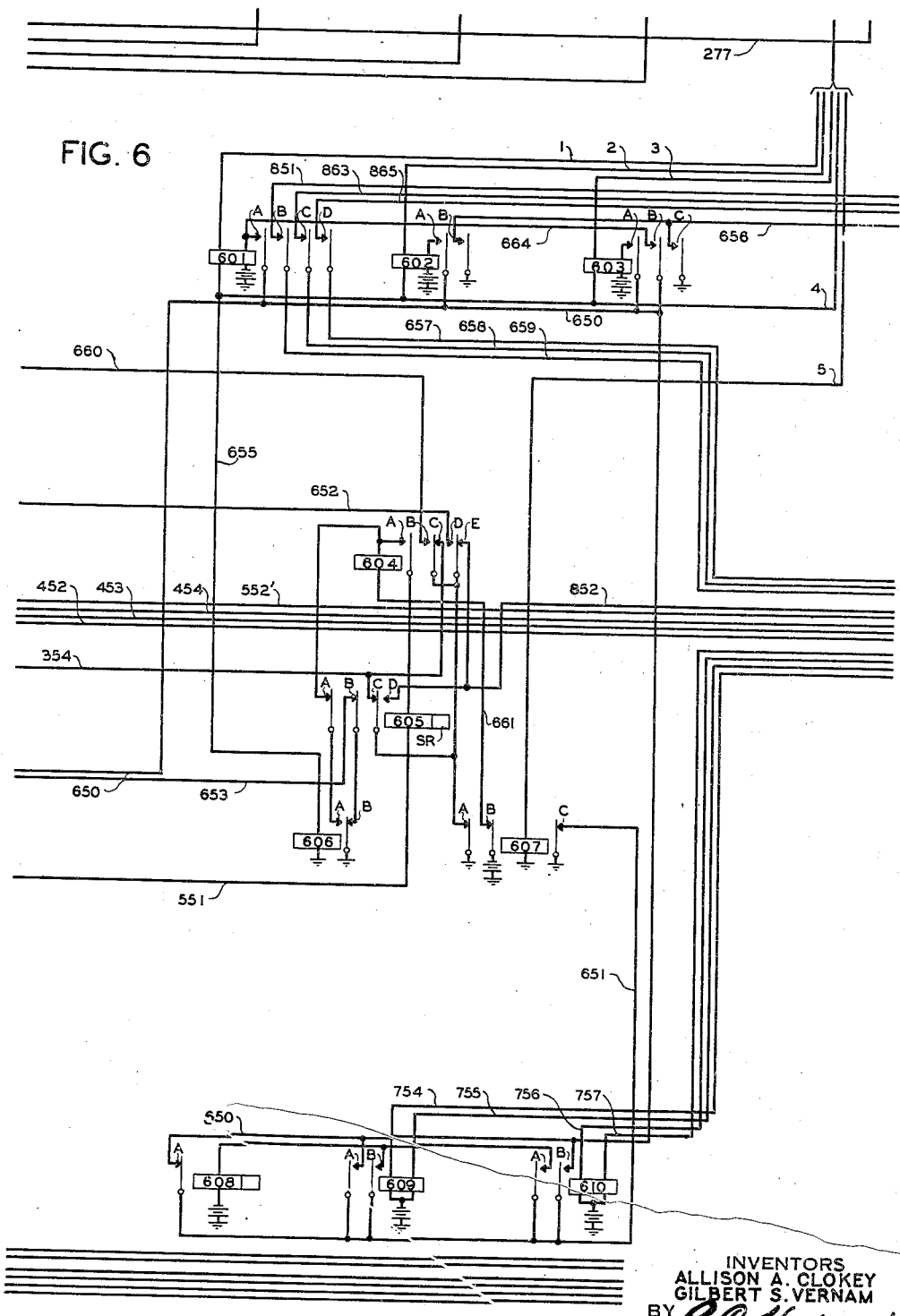
Fig. 6 shows the figure shift and shelf selection circuits together with certain control and releasing circuits.

Figure 1 shows the central station apparatus and equipment comprising a tape sending distributor unit generally denoted as 101, a tape printer, of a type well known in the art, generally denoted 102, comprising a keyboard 131 and a printer magnet 130, key 103, master sending relay 104, home record relay 105 and sending relays 106 and 107. Both direct keyboard transmission from the printer 102 and tape transmission apparatus from the tape sending distributor unit 101 is provided, since when the market is not extremely active, the direct keyboard method of sending is deemed preferable, while when the market is very active the transmission can best be handled by a tape transmitter.

The tape sending distributor unit 101 comprises a motor driven brush arm 110 (the motor is not shown) arranged to be driven over a distributor face having a common ring 111 and a segmented ring comprising seven segments 112 through 118. The tape sending unit includes a transmitter, similar to that used for multiplex transmission, comprising five transmitter contacts 119 through 123 arranged to make contact with either of two common contact strips 124 and 125. The position of the transmitter contacts 119 through 123 depends upon the perforations in the prepared tape. Associated with each transmitter contact is a pin (not shown); if there is a perforation in the tape above this pin, the transmitter contact makes contact with contact strip 124, otherwise with strip 125. The perforated tape may be stepped ahead mechanically by a cam on the brush arm drive shaft rather than by a magnet as is common in multiplex transmitters. As the means for advancing the perforator tape forms no part of the present invention it is deemed unnecessary to illustrate the cam and the tape stepping means controlled thereby. Brush arm 110 is driven through a friction clutch and may be stopped by lifting tape stop lever 126, thus opening the circuit of the clutch magnet 127 and allowing the stop arm 128 to stop and retain brush arm 110 on segment 112. Normally brush arm 110 rotates continuously.

With switch 103 in the position shown in Fig. 1, the tape sending distributor is connected for operation and the keyboard contacts of printer 102 are out of circuit.

In this case transmission is controlled through a previously prepared perforated tape. For example, let it be assumed that a tape has been prepared for transmitting the letter M and that this tape is inserted in the transmitter so that the perforations corresponding to the letter M will be above the pins after the next stepping action.

Then when the tape stop lever is closed (as shown), brush arm 110 is released and commences to rotate. While the brush arm passes over segment 112 a circuit is completed from battery through the right hand winding of relay 104, contact E and lever D of key 103, common ring 111, brush arm 110 and segment 112 to ground.

The master sending relay 104 is a polarized relay and has an electrical biasing current of approximately 30 milliamperes flowing from battery through its left hand winding to ground, and holding its armature to contact S. However, the current through its right hand winding is of approximately 60 milliamperes so that whenever the right hand winding circuit is closed, the relay armature lies on contact M.

When the armature of relay 104 lies on contact M, a circuit is completed from battery through the winding of each polarized relay 105, 106, 107, contact M and armature of relay 104 to ground. The current flow through the winding of each of these relays is in such direction as to move the armature of each relay to its M contact. Also when the armature of relay 104 lies on contact S a circuit is completed from battery through the winding of each relay 107, 106, 105, contact S and armature of relay 104 to ground. Then the armatures of relays 105, 106, 107 move to their respective contacts S.

Contact M of relay 105 is connected to negative battery while contact S is open. Consequently, as relay 105 operates, a circuit through the selector magnets 130 of printer 102 is made and broken. This make and break of the printer magnet circuit will cause the printer to operate and give a home record of the outgoing transmission in a manner common in the printer art. A printer of this type is disclosed in United States Patent No. 1,873,080, issued August 23, 1930 in the names of G. S. Vernam and F. G. Hallden, and the publications to which reference is made therein.

Other relays 106, 107, etc. have their respective contacts M connected to negative battery and their contacts S connected to positive battery, the armatures being connected to respective line wires $L_1$, $L_2$. Consequently as these relays operate, polar signals are impressed on the lines.

Now returning to the assumed transmission, when brush arm 110 reaches segment 113, ground is removed from the common 111 and, due to the relay connections just explained, the armatures of relays 105, 106, 107 move to their respective S contacts. Also at this time the stepping mechanism operates and the tape assumes a position such that the perforated code for "M" is directly above the transmitter pins. This allows transmitter contacts 119 and 120 to lie against strip 125 and transmitter contacts 121, 122 and 123 to lie against contact strip 124.

Brush arm 110 advances to segment 114. Ground remains off the common 111 and the relays lie on their respective S contacts.

The brush arm reaches segment 115, ground remains off the common and the relays lie on the S contacts.

When the brush arm reaches segment 116 a circuit is established from battery through the right hand winding of relay 104, contact E and lever D of key 103, common 111, brush arm 110, segment 116, transmitter contact 121 and contact strip 124 to ground. All relay armatures then move to respective contacts M.

When the brush arm passes over segments 117 and 118, the relay armatures again all lie on respective contacts M due to completion of circuits through transmitter contacts 122 and 123.

Finally, the brush arm again returns to segment 112 and regardless of the position of the transmitter armatures, the relay armatures are all moved to their M contacts.

Thus during the transmission of the letter M there has been sent over the various lines $L_1$, $L_2$ a signal, composed of: one interval of positive battery (the start signal), two intervals of positive battery (1st and 2nd pulses), three intervals of negative battery (3rd, 4th and 5th pulses), and a final longer interval of negative battery (the stop pulse).

These current impulses over line $L_1$ flow through the windings of polarized line relays 203 and 204 to ground. Similarly, the current impulses over line $L_2$ flow through the windings of polarized relays 201 and 202 to ground.

By throwing key 103 to its other position, clutch magnet 127 will release arm 128 and stop the brush arm 110, due to breaking the magnet circuit at contact A and lever B of the key. Also the brush arm 110 will be short circuited at contact C and lever D of the key 103 and the keyboard contacts 131 of printer 102 will be in circuit in place of the sending distributor unit. Signals will be sent from this in a similar and well known manner and will affect the relays 105, 106, 107.

RECEIVING APPARATUS

Figure 2 includes in addition to the receiving relays already mentioned a receiving distributor and a permutation relay unit. But one of the receiving relays, namely 203, is completely wired and connected to a receiving distributor. The other relays as 201, 202, 204 would be similarly connected and would operate other receiving distributors and permutation units in a manner similar to that to be described in connection with relay 203.

The brush arm 210 of the receiving distributor unit operates in synchronism with arm 110 of the sending distributor unit, that is when brush arm 110 rests on segment 118 brush arm 210 rests on segment 218 and when arm 110 moves to segment 112 so also does brush arm 210 move to segment 212, etc. This synchronism is maintained by the start stop method; that is the brush arms at the opposite ends of the line are driven by governed motors and maintained at slightly different speeds the receiving brush rotating about 12% faster than the transmitting brush the receiving brush being arranged to stop at the end of each revolution and start in phase with the transmitting brush at the beginning of the succeeding revolution.

Assuming that the signal received is that for the letter M the first impulse will be of positive polarity. This positive current flows through the winding of relay 203 to ground and moves the armature of that relay to contact S. A circuit is thus established from battery, thru the armature and contact S of relay 203, conductor 224, contacts 222 associated with cam 223 and start magnet 219 to ground. Start magnet 219 is energized pulling up its armature 220 and freeing cams 221. Cams 221 and 223 are mounted rigidly on the drive shaft of brush arm 210, as is shown schematically in Fig. 2. Consequently cam 221 releases the brush arm which now revolves under drive of a friction clutch (not shown). Cam 223 causes contacts 222 to open thus preventing further energization of start magnet 219 until the brush arm 210 has completed one revolution.

The next signal received is also of positive polarity and causes the armature of relay 203 to remain on contact S. At this time brush arm 210 is bridging the common ring 211 and segment 213 but as the armature of relay 203 is now on its S contact, the circuit of relay 250 is open. Since the circuit to magnet 219 is now broken at contacts 222 there is no operation during this interval.

The next signal is received while the brush arm is traversing segment 214 but since this signal is also positive no operation occurs.

The next or 3rd pulse signal is received while the brush arm is passing over segment 215. This signal is of negative polarity and consequently the armature of relay 203 moves to contact M. A circuit is then set up from battery thru the armature and contact M of relay 203, conductor 225, common ring 211, brush arm 210, segment 215, conductor 228 and winding of relay 252 to ground. Relay 252 is thus energized and locks over a circuit comprising battery, contacts A of relay 255, conductor 232, conductor 235, contacts A of relay 252 and winding of relay 252 to ground.

The fourth pulse is now received as the brush is traversing segment 216. This signal is also one of negative polarity and causes the armature of relay 203 to remain on its contact M. A circuit is thus established from battery thru armature and contact M of relay 203, conductor 225, common ring 211, brush arm 210, segment 216, conductor 229 and winding of relay 253 to ground. Relay 253 operates and locks over a circuit from battery thru contacts A of relay 255, conductor 232, conductor 234, contacts A of relay 253 and winding of relay 253 to ground.

The fifth pulse is now received. It is of negative polarity and again retains the armature of relay 203 on its contact M. Since the brush arm 110 is at this time on segment 217 a circuit is established from battery thru the armature and contact M of relay 203, conductor 225, common ring 211, brush arm 210, segment 217, conductor 230 and winding of relay 254 to ground. Relay 254 operates and locks over a locking circuit similar to those already described.

Brush arm 210 now passes to segments 218. At this time a negative polarity pulse is received (this is the stop pulse and as shown when the transmitting apparatus was described is always negative regardless of the signal combination transmitted). Relay 203 operates to move its armature to contact M which however has no effect at this time since the circuit from contact M of relay 203 is open at common ring 211. However a circuit is established from battery through segment 209, brush arm 210, segment 218, conductor 231 and magnet 247 to ground. Magnet 247 is energized pulling up stop arm 248 and releasing cam 249. Since cam 249 is rigidly attached to the brush arm drive shaft (as is shown schematically in Fig. 2) this permits brush arm 260 to rotate under the drive of a friction clutch (not shown).

Brush arm 260 first passes over segment 262. In so doing a circuit is completed from battery thru common ring 261, brush arm 260, segment 262, conductor 239, contacts B of relays 252—254, and thence thru certain parallel circuits from the armatures of the operated relays. The parallel circuits established from conductor 239 under the conditions assumed are: contacts B of relay 252, conductor 244, left hand or operating winding of relay 272 to ground; contacts B of relay 253, conductor 245, left hand or operating winding of relay 273 to ground; contacts B of relay 254, conductor 246, left hand winding of relay 274 to ground.

Relays 272, 273 and 274 consequently operate and lock over circuits from battery thru their respective right hand or locking windings, respective contacts A', common conductor 275 contacts A of relay 276 to ground.

During this interval brush 210 has traversed segment 218 and cam 221 has returned to the normal position as shown and since the circuit to magnet 219 is open at contact S of relay 203 the brush arm 210 is retained in its normal position by stop arm 220.

Also brush arm 260 has reached segment 263 thus completing a circuit from battery thru common ring 261, brush arm 260, segment 263, conductor 240 and winding of relay 255 to ground. Relay 255 operates, opening the locking circuits of relay 250—254 at its contact A. All operated relays of the group 250—254 now de-energize and resume their normal position and the receiving distributor is completely restored to normal awaiting the next transmission.

Now brush arm 260 reaches segment 264 closing a circuit from battery thru the common ring 261, segment 264, conductor 241 and thence over two parallel circuits to ground. The parallel circuits are: from conductor 241 thru contacts B of unoperated relay 270, contact D of unoperated relay 271, contact G of operated relay 272, contact M of operated relay 273 and contact M of relay 274; from conductor 241 thru conductor 277 and winding of relay 304 (Fig. 3).

In this connection it should be noted that the designations of the contacts of relay 274 correspond to the letter which may be selected by their closing, with the exception of certain "stunt" contacts which are numerically designated.

Brush arm 260 now reaches segment 265 which is connected to segment 264 and serves merely to prolong the impulse over the parallel circuits mentioned above. The brush arm now reaches segment 266 which is connected in common with segment 267 so that while the brush arm traverses segments 266 and 267 a circuit is closed from battery thru common ring 261, brush arm 260, segment 266 or 267, conductor 269 and winding of relay 276 to ground. Relay 276 operates opening contacts A and thus opening the locking circuits of relays 270—274 since ground is removed from conductor 275.

The foregoing material has shown by description and illustrative example one of a number of ways of transmitting coded signals from a central station to a plurality of receiving stations and a manner of receiving these signals and selecting a corresponding contact or circuit for operation to select the particular letter or symbol transmitted. This description is given by way of illustration only and not to in any way limit the transmitting and receiving mechanisms to those particularly described.

The following description concerns itself with the operation of the stock quotation board at one of the receiving stations.

QUOTATION BOARD

*Letter selection*

In the description immediately following, the circuits will not be traced in detail for this will be done in connection with the later description to be given of the posting of a specific quotation on the board of the present system.

Referring again to Figure 2, it is seen that the conductors connected to the contacts of final relay 274 of the permutation unit are divided into four groups. Two of these groups include conductors forming part of both the stock and price selection circuits of the board, a third group of conductors is included only in the stock selection circuits of the board and the fourth group is used as will be described below for "stunt" functions only.

Thus the left hand group of conductors, prior to a shift signal, forms part of the stock selection circuits and after a shift signal forms part of the price selection circuits. The particular letter selected by completion of the circuit thru any conductor of the group is indicated on the drawing.

Similarly, the next group is used for either stock or price selection circuits the letter selections possible being shown on the drawings.

The third group is used for stock selection only and the letters associated are again indicated on the drawing.

The fourth group of conductors is included in circuits which are used to perform the function of shifting the permutation unit conductors from stock selection circuits to price selection circuits, making shelf selections and releasing the mechanism when necessary as hereinafter more fully explained. This group of conductors is numerically designated.

In Figure 3 are shown the stock circuit transfer relays, 301, 302 and 303, the stock circuit pulsing relay 304, the stock circuit counting relays 305, 305', 306, 306', 307, 307' and the stock selection relays. The stock selection relays are divided into three groups, the first group being used to select the first letter of a stock symbol, the second group to select the second letter of the symbol, (if the symbol contains 2 letters) and the third letter group being used to select the third letter of the symbol. Only two relays of each of these groups are shown in order that the drawing may be simplified.

The relays of the first letter group are: 310 associated with "M" and 311 associated with "Q"; those of the second letter group are 312, associated with "M" when used as a second letter, and 313 associated with "Q" when used as a second letter; and those of the third group are 314 associated with "M" when used as a third letter and 315 associated with "Q" when used as a third letter.

Actually there would be 26 relays in each of these groups, that is there would be a first letter, second letter and third letter stock selection relay for each letter of the alphabet.

If any one of the 26 circuits of the permutation unit used for letter selection is completed momentarily the corresponding "first letter selection" relay will operate, and lock itself. When the permutation unit circuit is opened stock circuit transfer relay 301 operates and transfers the permutation unit circuits to the second letter selection relay group.

When a second letter signal is received over the line one of the permutation unit circuits is closed and the corresponding second letter selection relay operates and locks in its operated position. When the permutation unit circuit is opened a second stock circuit transfer relay 302 operates and transfers the permutation unit circuits to the third letter selection group of relays.

If a third letter signal is received one of the permutation unit circuits is closed momentarily and one of the group of third letter selection relays operates and locks in the operated position. Stock circuit transfer relay 303 operates when the permutation unit circuit is opened.

At this time one of the 26 stock selection relays of each group has been energized and locked in the operated position. If a "stunt" or figure shift signal is now received relay 606 will operate causing relay 604 to operate thus completing a circuit thru armature contacts A' of relay 302 to a bus wire 361 which connects to one of the armatures of each of the 26 first letter selection relays as 310, 311.

Since one of the first letter selection relays has been operated this circuit will be extended thru a contact of the operated relay to one of the armatures of a number of the relays of the second letter selection group.

One of the relays of the second letter selection group is also operated consequently the circuit is extended thru a contact of the operated relay to an armature of transfer relay 303.

Relay 303 is also operated, therefore the circuit is further extended to the armatures of a number of the relays of the third letter selection group and thru the corresponding contact of the operated relay of the group to one of the stock relays associated with a stock having a three letter designation and thru the winding of the stock relay (such as 801 corresponding to stock MMM). The stock relays are shown in Fig. 8. The selected stock relay operates and locks up and will remain locked until a subsequent stock selection is received as will be hereinafter explained.

Relay 606 now restores due to cessation of the figure signal. This causes the shunt circuit to be removed from the winding of relay 605 which relay then operates. Opening of contacts C of relay 605 removes ground from conductor 354 and thus from the locking circuits of relays 305–307' and all the letter selection relays. The letter selection relays and stock counting relays 305–307' are then restored to normal awaiting a new stock selection.

In the case described above, three letters were received before the shift signal, with the result that one of the three letter stock relays was operated. If we assume that the figure shift signal is received after only two letters are received then relay 606 is operated at a time when none of the third letter selection relays has been operated and also when relay 303 is not operated.

Under these circumstances a circuit will be closed for operating one of the two letter stock relays. This circuit may be traced thru contacts A' of relay 302, common conductor 361, the armature and contact of the operated first letter selection relay, armature and contact of the operated second letter stock selection relay, a corresponding armature and left hand contact of relay 303 (now unoperated) to the selected two letter stock relay, (as for example 802 corresponding to stock QM).

If the figure shift signal is received after one letter only has been transmitted one of the first letter stock selection relays will be operated and locked and relay 301 will be operated. Other stock selection relays will be unoperated as will other stock circuit transfer relays. In this case then a circuit will be extended thru contacts B' of relay 302 common conductor 360 and an armature and corresponding contact of the operated first letter selection relay to a single letter stock relay.

From the foregoing it is obvious that any of the stock relays can be operated by sending the proper letter combinations consisting of one, two or three letters followed by a figure shift signal.

In the circuit of Figure 3 connections for only two of the 26 stock selection relays of each group are shown. If the system were to be arranged to select a stock relay corresponding to any one of the 18,278 possible combinations of one, two or three letters it would be necessary to provide 26 sets of contacts on each relay of the second letter selection group in addition to the locking contact, 26×26 or 676 contact sets on stock circuit transfer relay 303, and 676 contacts sets on each of the relays of the third letter selection groups.

However in stock quotation boards as usually installed it is only necessary to select any one of about 200 stocks. For this reason the number of relay contacts may be greatly reduced. Instead of providing 26 sets of contacts on each of the relays of the second letter selection group it is only necessary to provide each of these relays with locking contacts and a pair of contacts for each two letter combination involving the given second letter, that is used either for a two-letter stock or as the first part of a three letter stock code. In the case of relay 303 it is necessary to provide sets of contacts equal in number to the two letters groups that are used both for two letter stocks and for the first part of three letter stocks. The relays of the third letter selection group must each have enough contacts to care for three letter stock codes which terminate in the same corresponding letter.

In the case of certain relays requiring a large number of contacts, it is obvious that a number of relays with a much smaller number of contacts could be connected to operate in unison and perform the same functions.

PRICE SELECTION—INTEGERS

In Figure 4 is shown that portion of the price selection circuit used for selecting the integers of the price. This portion of the price circuit includes price circuit transfer relays 401, 402 and 403; the price circuit pulsing relay 404, price circuit counting relays 405, 405', 406, 406', 407, 407' and the price selection relays 410, 419, 420, 429, 430, 439. The price selection relays are divided into three groups, the hundreds digit selection relays of which there are ten (only the first and last, 410 and 419 are shown), the tens digit selection group also comprising ten relays of which but two, 420 and 429 are shown and the units digit selection group of ten relays of which but two, 430 and 439, are shown. The remaining eight relays of each group would be wired similarly to the two shown connected.

When the stock selection circuit was described it was shown that on reception of the figure shift signal, relay 604 was operated and the circuit to the selected stock relay completed. Operation of relay 604 also causes a circuit to be closed thru the winding of relay 401 in a manner more fully hereinafter described.

Operation of the relay 401 shifts the first group of conductors of the permutation unit to the price selection circuits so that any signal now received over this group of conductors will be effective to cause price selection rather than stock selection. When the first signal is received one of the number of permutation circuits will be closed; that is a circuit including one of the first group of conductors will be closed. This circuit will extend thru one of the ten right hand contacts of relay 401, one of the ten left hand contacts of relay 402, upper or operating winding of one of the hundreds digit selection relays as 410, common conductor 450, winding of relay 404, conductor 451, contacts B of relay 407', common conductor 650, contacts A of relay 608 and conductor 651 and contacts C of relay 607 to ground.

Relay 404 operates and one of the hundreds digit selection relays operates and locks. Operation of relay 404 causes relay 405 to operate in a manner fully described hereinafter and after the permutation circuit is opened relay 404 releases and relay 405' operates closing a circuit thru the winding of relay 402 which then operates.

If a second integer signal is now received a circuit is completed thru one of the ten right hand contacts of relay 401, one of the right hand contacts of relay 402, one of the left hand contacts of relay 403, winding of one of the tens digit selection relays and thru common 450, relay 404 and conductor 451 to ground as before.

Again relay 404 operates and at this time one of the tens digit selection relays 420–429 also operates and locks. Operation of relay 404 causes relay 406 to operate. When the permutation circuit is opened relay 404 releases and relay 406' operates completing a circuit thru the winding of relay 403 which also operates.

If now a third integer signal is received it becomes effective over a circuit including one of the right hand contacts of relay 401, a right hand contact of relay 402, a right hand contact of relay 403, winding of one of the units digit selection relays 430–439 and winding of relay 404.

The selected units digit relay operates and locks in its operated position. Also relay 404 is again energized and causes relay 407 to operate. Upon the opening of the circuit thru the winding of relay 404, relay 407' operates and removes ground from winding of relay 404 making that relay inoperative.

Operated relays 405, 405', 406, 406', 407, 407' are locked in their operated positions as are three price selection relays one of the hundreds digit selection group, one of the tens digit selection group and one of the units digit selection group.

Since the board is shown with sufficient apparatus for posting stock prices in three digits and a fraction as a maximum the next signal sent will be one representative of the fractional part of a dollar forming part of the price. It is to be understood however that the price circuits could be extended to care for prices in any number of digits.

PRICE SELECTIONS.—FRACTIONS

In Figure 5 is shown the portion of the price circuits used to select the fractions of a stock price. This portion includes price circuit transfer relay 501, fractions pulsing relay 502, and fractions counting relays 503 and 503', as well as the fractions selection relays 504 thru 511. In this case the entire group of relays is shown in the drawings. This group includes eight relays one for each fraction, 1/8–7/8, and one for blank.

Price circuit transfer relay 501 is connected over conductor 475 in series with relay 401, consequently when relay 401 operated, that is when the figure shift signal was received, relay 501 also operated. Operation of relay 501 transfers the second group of permutation unit conductors from the stock selection circuits to the fractions price selection circuits.

The reception of a fractions signal momentarily closes a circuit thru one of the permutation unit conductors of the second group. The closed circuit extends thru one of the ten right hand contacts of operated relay 501, the winding of one of the eight relays 504–511 of the fractions selecting group, common conductor 550 and the winding of pulsing relay 502. One of the relays of the fractions selecting group operates and locks and relay 502 operates.

Operation of relay 502 completes a circuit from battery thru the winding of relay 503, contacts A of relay 503' and contacts A of relay 502 to ground. Relay 503 operates and removes ground from conductor 551 thus releasing relays 605 and 604 as will be hereinafter more fully described. When relay 502 releases relay 503' will operate in series with relay 503. Operation of relay 503' restores the ground connection to conductor 551 and relay 605 so that relays 605 and 604 may operate again if the figure shift signal for the next quotation is received before relays 503 and 503' have released. When relay 604 releases, ground is removed from conductor 652 causing relays 401 and 501 to release thereby transferring the first and second groups of conductors of the permutation unit back to the stock selection circuits. Also when slow releasing relay 605 releases the ground connection over conductor 653 to relay 304 is restored so that this relay may operate to select letters when the next signal is received. At this time also the locking circuits of the first, second and third letter selections relays and the associated counting relays are restored at contacts C of relay 604.

However, due to the slow releasing characteristic of relay 605 ground is restored to conductor 852 at contacts E of relay 604 prior to the release of relay 605 so that the selected stock relay remains locked in its operated position until a new stock selection and a new figure shift signal is received.

The preceding description of the operation of the price circuit, shown in Figures 4 and 5, deals with the case of transmission of a complete price consisting of three digits and a fraction. Since price changes will usually occur only in the fractions or possibly the units digit and the fractions, the circuit is so arranged that only the highest order digit which is changed and the digits of orders below that and fractions need be changed, retaining the feature of transmitting the quotation in order.

Before describing the register operating circuits and the connections of the price selection circuits thereto the register used in posting the quotation selected will be described since these price circuits are designed especially for use with these novel registers.

REGISTER UNITS

Figure 9A:
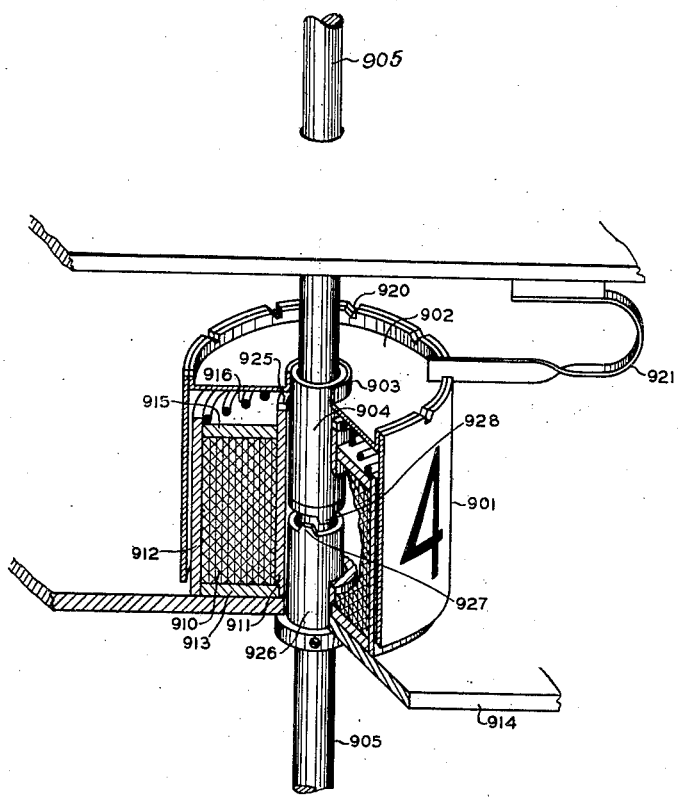
Fig. 9A is a detailed view of one of the novel registers used employed in posting quotations on the board.
Figure 9:
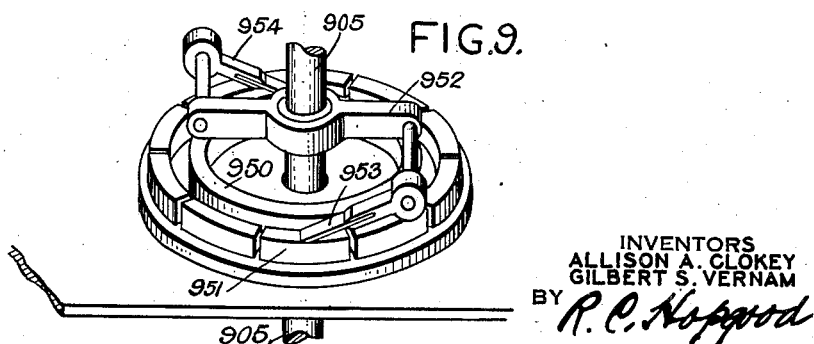
Fig. 9 is a detailed view of one of the register clutch magnet control commutators associated with one of the register drive shafts.

Figs. 9 and 9A show the construction of the register control commutator and the type of register, respectively, employed in the present system. The register drum 901 is a thin aluminum cylinder about 1½" in diameter and about 1 5/16" long which carries the numerals 1 to 9 and 0 equally spaced about its surface circumferentially. If the register is to be used in the fractions position the drum carries fractions 1/8–7/8 and 0.

The aluminum cylinder 901 is attached at the top to a sheet iron disc 902. Disc 902 carries a central flanged bushing 903 into which is inserted a bronze tube 904. A vertical shaft 905 arranged for continuous rotation extends through tube 904 without touching it. Sheet iron disc 902 is the armature of an iron clad electro-magnet comprising a coil 910, the core of which is an iron tube 911 split to curtail eddy currents. It is to be noted that core 910 and the lower portion of tube 911 are cut away at the right hand side of the section in order to show the shaft 905 and other portions of the mechanism more clearly.

The magnetic return circuit consists of a split iron tube 912 surrounding the coil and an iron disc 913 at the bottom of the coil. The entire magnet comprising coil 910, core 911, casing 912 and disc 913 is supported by an external support as 914 thru which shaft 905 extends.

Register drum 901 is thus free to rotate and to move vertically, the vertical travel being limited by stops to be described later. Inserted above coil 910 between tubes 911 and 912 is a fiber head 915 on which rests a spiral spring 916 which presses against disc 902 and thus tends to push the disc 902 and register drum 901 upward. Around the upper edges of drum 901 and the attached flange of disc 902 are ten uniformly spaced teeth as 920 of a peculiar shape as shown in the drawing. A stop spring 921 mounted on a fixed support, as shown, engages these teeth preventing rotation of the dial when in its upper position. When the magnet, hereinafter called the register clutch magnet, is energized the drum 901 is drawn downward whereupon the teeth as 920 clear stop spring 921 freeing the register drum for rotation. While in the lower position disc 902 rests on a bronze ring 925 which is secured to the upper edge of split iron tube 911.

A steel tube or hub 926 extends thru the magnet support 914 and the lower part of magnet core 911. This hub is attached to shaft 905 and rotates it. A projecting tooth 927 is formed on the upper edge of hub 926 and is adapted to engage a similarly shaped tooth 928 on the lower edge of the central bronze tube 904. Thus when the register drum 901 is drawn downward by the action of the register clutch magnet the register drum will be rotated by the shaft 905 and in a fixed relation to that shaft.

In the system under discussion a number of these registers will be required to register the price of each stock, since each register can indicate but one digit or fraction of the price. As shown in Figure 8 it is proposed in this system to have four registers on the last shelf to indicate the current price and three registers on each of the other shelves for the low, high and open price registrations respectively making a total of 13 registers for each stock. Common shafts are used for all dials used to register the same order of figures, that is the fractions registering drums are all arranged to be driven by one shaft, the units registering drums by a second, etc. Associated with each one of these four shafts, there is a commutator as shown in Figure 9. This commutator consists of a common ring 950 arranged concentrically within a ring of segments as 951. These outer segments are ten in number on three of the commutators (corresponding to the ten numerals on the integer register drums) and eight in number on the fourth (corresponding to the eight fractions on the fractions register drum). Mounted on shaft 905 is an arm 952 which rotates with the shaft. Arm 952 carries two brushes 953 and 954 electrically connected to each other. The brush arm 952 is so mounted on the shaft that brush 953 is in phase with tooth 927—that is when tooth 927 is in such a position that if tooth 928 were being driven by it and the numeral 1 were in front of the display window then brush 953 will lie on the segment of the commutator corresponding to the numeral 1.

The circuits are so arranged that after the register clutch magnets are energized tooth 927 strikes tooth 928 and causes rotation of register drum 901. The register clutch magnets are subsequently released when the circuit to the magnet is broken due to brush as 953 having reached a selected segment (selected by the price circuits) of the associated commutator. All shafts are driven from a common driving means.

Figure 7 as was indicated shows the four commutators necessary, the shafts, common driving means for the shafts while Fig. 8 illustrates two groups of registers for registering the price of selected stocks.

REGISTER OPERATING CIRCUITS

Returning now to the price selection circuits it will be seen that each relay of the hundreds digit selection group (Fig. 4) has four sets of contacts, one set of which is in the relay locking circuit, a second of which extends to a segment of the commutator associated with the hundreds digit register, a third of which extends to a segment of the commutator associated with the tens digit register and the fourth of which extends to the commutator associated with the units digit registers.

Each relay of the tens digit group has three sets of contacts, one for locking the relay, one connected to the tens commutator and one connected to the units commutator.

Each relay of the units digit group has two contacts, one for locking that relay and one connected to a segment of the units commutator.

The common rings M of the commutators 710, 711, 712, 713 are connected by conductors 750, 751, 752 and 753 respectively to the armatures of relays 717, 721, 725, 729. Also the winding of relay 717 is connected thru common conductor 452 to contact B of relay 407 and, when relays 405—407' and 503 are operated, thru contact B of relay 407, conductor 453 contact B of relay 406, contact B of relay 405, conductor 552, contacts B of relay 503 to ground.

Similarly the winding of relay 721 is connected over conductor 453 to contact B of relay 406 and when that relay is operated and relays 405 and 503 are also operated over contact B of relay 406, contacts B of relay 405, conductor 552 and contacts B of relay 503 to ground.

Also the winding of relay 725 is connected over conductor 454 to contact B of relay 405 and, when both that relay and relay 503 are operated over contact B of relay 405, conductor 552 and contact B of relay 503 to ground.

It has been shown that when three digits and a fraction are received one relay of each of the groups 410, 419; 420, 429; 430, 439; and 504–511 is operated. Relay 503 is also operated as are relays 405, 405', 406, 406', 407, 407'. Therefore current flows from battery thru the winding of relay 729 conductor 552', contact B of relay 503 to ground. Also there is a circuit formed from battery thru the winding of relay 725, conductor 454, contact B of relay 405 and to ground at contact B of relay 503. A circuit is also completed from battery thru winding of relay 721, conductor 453 and contacts B of relay 406 contact B of relay 405 and to ground at contact B of relay 503, and a circuit is completed from battery thru the winding of relay 717, conductor 452, contacts B of relay 407, contacts B of relay 406, contact B of relay 405 and to ground at contact B of relay 503.

The ground applied to conductor 552' also extends over conductor 553 and contacts B of the operated relay of the group 504–511 to the corresponding segment of the fractions commutator.

Also the ground applied to conductor 452 is extended over conductor 455 and contacts B of the operated relay of the units group 430–439 to a segment of the units commutator.

Ground is extended also from conductor 455, thru contacts B of an operated relay of the hundreds group 410–419 to a segment of the hundreds commutator.

Moreover ground from conductor 452 is extended over contacts E of relay 407, conductor 456 and contacts B of the operated relay of the tens group to a segment of the tens commutator.

Due to the completion of circuits thru the windings of relays 717, 721, 725, 729, these relays all operate when relay 503 operates unless the brushes of the commutator associated lie on the segment to which ground is extended. If this is the case the relay winding is shunted out, the grounded circuits then being, for example, from battery thru contacts B of relay 729, conductor 753, common ring M of commutator 713, brush arm N and the segment of the commutator thru contacts B of the operated fractions relay of the group 504–511 and to ground at conductor 553 and from battery, winding of relay 729, conductor 552', to grounded contacts B of relay 503. Thus relay 729 will not operate until brushes N leave the grounded selected segment.

Also when relay 503 operates and conductors 452, 453, 454, 552 and 552' are grounded as explained, since a stock relay has already been operated, circuits are completed from battery thru the register clutch magnets of a group of registers associated with the operated stock relay, thru contacts of the said stock relay and contacts B of relays 714, 718, 722 and 726 respectively and to ground over previously traced circuits to operate register clutch magnets 810, 811, 812, 813 respectively associated with the hundreds, tens, units and fractions register drums of the current price shelf for the selected stock, whereupon the associated register drums commence to rotate.

When the brushes leave the grounded segment, or immediately upon operation of relay 503 if the brushes were not on the grounded segment at that time, relays as 729 operate. When the brushes reach the grounded segment a circuit is momentarily completed from battery thru windings of relays as 727, contacts A of relays as 728, contacts A of relays as 729 conductors as 753 common ring M of commutator as 713, brush arm N, commutator segment, contacts B of relays as 504 to grounded conductor 553.

Relays as 727 operate closing circuits from battery thru windings of relays as 727, contacts A of those relays, windings of relays as 728 to grounded conductors as 552'. As soon as brushes N of commutator as 713 leave grounded segments relays as 728 operate.

When the brushes again reach grounded segments a circuit is established from battery thru the windings of relays as 726, contacts B of relays as 728, contacts A of relays as 729, conductors as 753, common rings M of commutator as 713, brush arm N of the commutator to the grounded segments.

Relays as 726 operate and lock in the operated position. Due to operation of such relays ground is removed from the associated register clutch magnets and consequently they release whereupon the register drum is forced upward by the spring and comes to rest with the numeral corresponding to the selected commutator segment in the display position.

RELEASE CIRCUITS

Operation of relays 714, 718, 722 and 726 also opens at respective contacts A the circuits thru conductors 754, 755, 756 and 757 to the associated windings of relays 609 and 610. Contacts A and B of both relays then open breaking the circuit thru the winding of relay 608. Since, however, relay 608 is slow releasing the multipled contacts A of relay 608, A and B of relay 609, A and B of relay 610 are now all open, bus conductor 650 and associated conductor 462 is no longer grounded and relays 405, 406, 407, 503 and all the operated relays of the price selection groups release and restore to normal.

Relay 503' is also deenergized at this time but due to its slow releasing characteristic it releases after relay 503. Ground is thus restored to conductor 551 to prepare relays 604 and 605 for operation when the figure signal of the next quotation is received.

The foregoing material considers a case in which a full price of three digits and a fraction is posted. However this is not usually the case; often only the fraction changes; at times the fraction and units digit, and occasionally the fraction, units and tens digits.

If the new price consists of fraction, unit and tens digits, they are sent as before; the tens first, units second and fractions last.

As in a full price selection the first received signal of the price selection group becomes effective to operate one of a group of hundreds digit selection relays and to subsequently operate the price selection transfer relay 402. The second signal then operates one of the tens digit selection relays and price selection transfer relay 403. But in this case the third signal is received from a fractions selection circuit and operates one of the fractions selection relays at the same time operating relay 502 releasing relays 604 and 605 causing reconnection of the permutation unit circuits to the stock selection circuits and applying ground to conductors 552, 552', 553 etc. Under these conditions relays 405, 405', 406, 406' will have operated but relays 407 and 407' will not. Consequently circuits are set up to operate the tens, units and fractions register clutch magnets only. The circuit for operating the tens digit register clutch magnet is traced from battery thru tens digit register clutch magnet as 811, contact of the operated stock relay, contacts B of relay 718, conductor 453, contacts B of relay 406, contacts B of relay 405, conductor 552, and contacts B of relay 503 to ground. The circuit for operating the units register clutch magnet is a similar one leading however thru the contacts of relay 722 conductor 454, and contacts B of relay 405 and so to ground.

As before the fractions register clutch magnet 813 is grounded at contacts of relay 726 due to conductor 522' being grounded by operation of relay 503.

In addition it should be noted that selected segments of the tens and units commutators are grounded. That is the selection among the hundreds digit selection relays becomes effective on the tens digit commutator and the selection set up on the tens digit selection relays becomes effective on the units digit commutator. This result also occurs due to the non-operation of relays 407 and 407'.

A circuit from ground to the correct segment of the tens digit commutator is extended thru contacts B of relay 503, conductor 552, contacts B of relay 405, contacts B of relay 406, contacts C and D of relay 407, conductor 457, contacts C of the operated hundreds digit selection relay and conductor as 471 to the correct segment of the tens digit commutator.

A circuit is also extended from conductor 552 thru contact B of relay 405, contact B of relay 406, contacts C of relay 407, conductor 458 contacts C of the operated tens digit selection relay and conductor as 472 to the correct segment of the units digit commutator.

In the same manner as was described ground is also extended to the correct segment of the fractions commutator.

Since under these conditions conductor 452 which connects to the hundreds digit register clutch magnet is not grounded at contacts B of relay 407 that magnet can not operate and the hundreds digit register drum remains in its previous position.

Referring now to a quotation including a change in the units digit and the fraction only it is seen that relays 405 and 405' are the only ones of the group 405–407' to operate extending ground to the units digit register magnet only (over conductor 454); also ground is extended from contacts B of relay 503 over conductor 552, contacts B of relay 405, contacts C of relay 406, conductor 459, contacts D of the operated hundreds digit selection relay, and conductor as 472 to the correct segment of the units digit commutator.

If the quotation embody a change in the fractions only none of the relays 405–407' is operated and the only register clutch magnet which is grounded for operation is 813; the ground being applied over conductor 552' due to operation of relay 503.

The foregoing material describes the posting of a current quotation for a stock the symbol for which contains either one, two or three letters and the price of which is in either one, two or three digits and a fraction, or a fraction alone.

Shelf Selection

In addition to the posting of the current price arrangements are made for posting the opening, high and low prices. Since the opening price, that is the first price posted for any stock during a market day, is also at that time the high, low and current price the registers of all these shelves are arranged to operate together when the open shelf is selected. The low shelf registers and the high shelf registers are also arranged to operate in unison with the corresponding current price shelf registers when a "low" figure shift or "high" figure shift signal respectively is received.

The circuits for accomplishing this result are shown in Figure 6 extending in some instances to Figure 8. If a low-figure shift signal is received on the permutation unit a circuit is completed thru conductor 1 associated with the low-figure shift contact 1 of the permutation unit (Fig. 2), the left hand or operating winding of low shelf relay 601, conductor 655 and winding of relay 606 to ground. Relay 606 then operates with the same effect as when operated by closure of the last-figure shift circuit. Relay 601 also operates and locks now however and extends circuits from contacts F, G, H of the operated stock relay, over conductors 851, 853 and 865, contacts B, C, D of relay 601, conductors 659, 658 and 657 to join bus conductors 453, 454, 552' at contacts B of relays 718, 722 and 726 respectively. Due to completion of these circuits register clutch magnets as 814, 815 and 816 are prepared for operation and will operate in unison with respective current price register clutch magnets as 811, 812, 813 when conductors as 453, 454, 552' are grounded.

If a high-figure shift signal is received a circuit will be closed thru conductor 2 (Figs. 2 and 6) left hand winding of relay 602, conductor 655 and winding of relay 606 to ground. Relays 606 and 602 operate. Relay 602 locks due to completion of a circuit from battery thru its right hand winding and locking contacts A to grounded conductor 650. When relay 602 operates a circuit is completed from battery thru the winding of an auxiliary stock relay, as 803, contacts E of a stock relay as 801, conductor 656, contacts B of relay 602 to ground. Relay as 803 operates putting register clutch magnets as 817, 818, 819 in multiple with magnets 811, 812 and 813. Consequently when the magnets of the last shelf operate the magnets of the high shelf operate also and when the last shelf register drums are rotated to their selected positions the register drums of the high shelf rotate to respectively corresponding positions.

If the open-figure shift signal is received a circuit will be closed thru conductor 3 associated with the open-figure shift contact 3 of the permutation unit, left hand or operating winding of relay 603, conductor 655 and winding of relay 606 to ground. As before relay 606 will operate and in series with it relay 803 will also operate. Relay 603 will then lock over a circuit from battery thru its locking contacts A to grounded conductor 650. Closure of contacts C of relay 603 again grounds conductor 656 and causes relay 803 to operate; thus connecting the register clutch magnets of the high shelf in multiple with corresponding register clutch magnets of the current price shelf. Closure of contact B of relay 603 completes a circuit from grounded conductor 650, over conductor 664 thru the right hand or locking winding of relay 601 to battery. Relay 601 then operates and locks to grounded conductor 650 over its contacts A. Closure of contacts B, C, D of relay 601 connects the register clutch magnets of the low group to conductors 453, 454, 552' (thru contacts F, G, H of the selected stock relay). Since at this time relay as 803 is also operated the register clutch magnets of the open group are connected in multiple to those of the low group and are prepared for operation. Consequently when the open-figure shift is selected all of the register drums for displaying quotations pertaining to a selected stock are prepared for operation and operate in unison when conductors 453, 454 and 552' are grounded.

Release Circuits

Occasionally an error in setting up the quotation is discovered prior to the full transmission of the quotation. In order that the transmission of the incorrect quotations will not have to be completed before the correct quotation may be sent, and because if the incorrect quotations had to be completed an erroneous quotation would appear on the board, a release circuit is provided. This release circuit is made operative by sending a release signal which closes the release circuit 5 of the permutation unit completing a circuit to the winding of release relay 607 which then operates. Opening of contacts A of relay 607 removes ground from the contacts of relays 604 and 605, while opening of contacts B removes battery from the winding of relay 604 and 605 and opening of contacts C removes ground from bus conductor 651 and 650. Due to this all the relays of the board restore to their normal position.

Operation of Board in Posting a Specific Quotation

The foregoing description gives the general method of posting a quotation but does not trace the circuits in detail. Following, is a description of the operation of the board during the posting of a particular quotation, the various circuits being traced in detail.

Let it be assumed that the quotation transmitted is MMM 110⅜. Description of the transmitting and receiving apparatus showed that when the letter M was received a circuit was established thru the contacts of the permutation unit relays to a conductor associated with a single letter only. Thus when M is received circuits are completed (as soon as brush arm 260 reaches segment 264) as follows: from battery thru common ring 261, brush arm 260, segment 264, conductor 241, conductor 277, winding of relay 304, conductor 653, contacts B relay 605 and contacts B relay 606 to ground: and another circuit common in part with the first from battery thru common 261, brush arm 260, segment 264, conductor 241, contact B of relay 270, contact D relay 271, contact G relay 272, contact M relay 273, contact M relay 274, conductor M, contacts M of relay 301, conductor 350, left hand or operating winding of relay 310, common conductor 351, contacts B of normal relay 307', conductor 354, contacts C of non-operated relay 604, and contacts A of relay 607 to ground. Due to completion of these two circuits, relays 304 and 310 operate. Relay 310 locks in its operated position due to a circuit completed from battery thru its right hand or locking winding, locking contacts A and conductor 352 to conductor 354 which is grounded, as before mentioned, thru contacts C of relay 604 and contacts A of relay 607. Operation of relay 304 closes a circuit from battery thru the winding of relay 305, contacts A of relay 305' to ground at contacts A of relay 304, causing relay 305 to operate. Brush arm 260 shortly leaves segment 265 which opens the circuit to the winding of relay 304. Contacts A of relay 304 open but a circuit is now completed from battery thru the winding and locking contacts A of relay 305, winding of relay 305', conductor 355, conductor 352 to grounded conductor 354. Due to this circuit relay 305 is held locked and relay 305' is operated. Closure of contacts D of relay 305' closes a circuit from battery thru the winding of relay 301, conductor 356 and contacts D relay 305' to ground.

Stock circuit transfer relay 301 now operates transferring the permutation unit conductors from contacts as M to contacts as M'. The next signal is received again operating relay 304 in the same manner as before. However the circuit from the permutation unit now extends over contact M' relay 301, contact M' relay 302, conductor 357 to the winding of relay 312 and thence over conductor 358, thru contacts C of relay 305' to conductor 351 which is, as before stated, connected to grounded conductor 354 at contacts B of relay 307'. Relay 312 (which is the relay associated with M used as a second letter) operates and locks in its operated position over a circuit from battery thru its right hand winding and locking contacts A to grounded conductor 352.

Operation of relay 304 has completed a circuit from battery thru the winding of relay 306, contacts A of relay 306', conductor 359, contacts B of relay 305' to ground at contacts A of relay 304. Relay 306 operates and contacts A of relay 306 of course close. However, since there is a direct circuit to ground as just explained current does not flow thru the locking contact until relay 304 is de-energized. Upon the de-energization of relay 304 relay 306' operates over a circuit from battery thru the winding and locking contacts A of relay 306, winding of relay 306' and conductor 355 to grounded conductor 354. Closure of contacts D of relay 306' completes a circuit from battery thru the winding of relay 302, conductor 362, contacts D of relay 306' to ground. Transfer relay 302 now operates moving its armature from contacts M' to contacts M''. The third M impulse is now received again closing the circuit thru the brush 260 but this time extending the circuit from M conductor thru contacts M'' relay 301; contacts M'' of relay 302, conductor 363, left hand winding of relay 314, conductor 364, conductor 366, contacts C of relay 306' (now closed) and contacts B of relay 307' to grounded conductor 354. Relay 314 operates and locks in the operated position due to completion of a circuit from battery through its right hand winding, locking contacts A, conductor 353, conductor 352 to grounded conductor 354.

Relay 304 also operates in unison with relay 314, operation of relay 304 completes a circuit from battery through the winding of relay 307, contacts A of relay 307', contacts B of relay 306', contacts B of relay 305' and contacts A of relay 304 to ground.

Relay 307 thus is operated and a circuit prepared for operation of relay 307' as soon as relay 304 releases. When the brushes leave segment 265 relay 304 releases and relay 307' operates over a circuit from battery through the winding of relay 307, locking contact A of relay 307, winding of relay 307', conductor 355 conductor 352 to grounded conductor 354.

Operation of relay 307' closes a circuit from battery through the winding of relay 303, conductor 365, contacts C of relay 307' to ground. Contact B of relay 307' is now open and consequently ground from that contact is removed from conductors 351, 366 and 358 thus removing ground from the operating windings of all relays 310 to 315, the operated relays of the group being held energized by the current through their locking windings as explained. This is done to prevent the possibility of a false operation of the stock selecting relays during the subsequent price selecting operations.

At the time relay 307' operated relay 303 operated, moving all armatures from contacts as M'' to M'''. Since relay 302 is also operated as described, a circuit is now extended from conductor 660 over contacts A' of relay 302, conductor 361, contacts C of operated relay 310, conductor 368, contacts C of operated relay 312, contacts M''' of relay 303, conductor 369, contacts C of operated relay 314, conductor 370, winding of relay 801, associated with the registers for the stock designated by the symbol MMM, conductor 850 and lamp 830 to battery. This circuit does not yet become operative but is simply prepared at this time for operation when ground is applied to conductor 660.

The next signal received is a figure shift. Assuming that the price 110% is a new low for the stock MMM, then as previously explained, a low figure shift signal is transmitted over the line whereby the permutation unit is operated to complete a circuit to contact designated I. A circuit will then be completed from the contact I of the permutation unit, conductor I through the left hand winding of relay 601, conductor 655 and winding of relay 606 to ground.

Relays 606 and 601 will now operate. The contacts B of relay 606 open, thus removing ground from conductor 653 and winding of relay 304. This is to insure that relay 304 shall not operate during the subsequent reception of the price selections which might otherwise happen if relay 304 remained closed. For this reason also relay 606 is slightly faster in operation than similar relay 304.

Closure of contacts A of relay 606 completes a circuit from battery through contacts B of relay 607, conductor 661, winding of relay 604, contacts A of relay 605 and contacts A of relay 606 to ground.

Operation of relay 601 completes four circuits. One of these is its own locking circuit and comprises battery, right hand or locking winding, locking contacts A to conductor 650 (which is grounded through contacts A of unoperated relay 608, conductor 651 and contacts C of relay 607). Closure of contact B of relay 601 extends a circuit from contact F of relay 801 through conductor 851, contact B relay 601, conductor 659 to contacts B of relay 718 and thence over conductor 453 to the price selection circuit as will be more fully described hereinafter. Similar circuits are extended from contacts G and H of stock relay 801 over contacts C and D respectively of relay 601.

Relay 604 operated at the time the figure shift circuit was closed over a circuit previously traced. Closure of contacts A of that relay completes a circuit from battery through contacts B of relay 607, winding of relay 604, contacts A of relay 604 to the winding of relay 605 and thence over conductor 551 to ground at contacts C of unoperated relay 503. Relay 605, however, does not operate at this time since the path directly to ground from the winding of relay 604 through contacts A of relays 605 and A of 606 shorts out the winding. Closure of contacts B of relay 604 completes a circuit from battery through lamp 830, conductor 850, winding of relay 801, conductor 370, contacts C of relay 314, conductor 369, contacts M''' relay 303, contacts C relay 312, contacts C of relay 310, conductor 361, contacts A' of relay 302, conductor 660, contacts B of relay 604 and contacts A of relay 607 to ground. Closing of contacts D of relay 604 completes a circuit from battery through winding of relay 401, conductor 475, winding of relay 501, conductor 652, contacts D of relay 604 and contacts A of relay 607 to ground. Opening of contacts C occurs at this time also but without effect, since ground continues to be supplied to conductor 354 through contacts C of relay 605. Opening of contacts E of relay 604 opens the circuit from ground through conductor 852 to the locking windings of the stock relays 801, 802, etc. and allows any previously operated stock relay to release.

The selected stock relay now operates over the circuits described before and prepares circuits to be hereinafter described for posting the price of said selected stock. Also lamp 830 lights to indicate which register unit is to be affected.

Also transfer relays 401 and 501 now operate, transferring the integer and fraction groups of conductors from the stock selection circuits to the price selection circuits.

When brush arm 260 leaves segment 265, relay 606 is deenergized and contacts A open, removing the short circuit mentioned, from the winding of relay 605 and permitting relay 605 to operate over a circuit from battery, contacts B of relay 607, winding and contacts A of relay 604, winding of relay 605, conductor 551, to ground on contacts C of relay 503.

Closure of contacts D of relay 605 restores the ground to conductor 852 and through it to the locking contact L of stock relay 801 which now locks, therefore, in its operated position. Despite the release of relay 606 relay 605 at its B contacts holds open the circuit from ground to relay 304 thus insuring that the latter relay will not operate during the price selection. Opening of contacts C of relay 605 removes ground from conductor 354 and thus from the locking windings of the stock selection relays and from the locking windings of relays 305–307' allowing these relays to return to normal position awaiting the next stock selection.

At this time the first price selection impulse is received. This is a signal for the integer "1", consequently a circuit is completed from battery through brush arm 260, segment 264, conductor 241, contact A of relay 270, contact A of relay 271, contact A relay 272, contact B relay 273, contact Q relay 274, the conductor Q, contact I relay 401, contact I relay 402, conductor 461, upper or operating winding of relay 410, bus conductor 450, winding of relay 404, conductor 451, contacts B relay 407' to grounded bus conductor 650.

Relays 404 and 410 now operate. Operation of relay 404 closes a circuit from battery through winding of price counting relay 405, contacts A relay 405' and contacts A of relay 404 to ground. Relay 405 operates.

Closure of contacts A of relay 410 completes a circuit from battery thru the locking contacts A of relay 410 and through these contacts to conductor 462 and thence to grounded bus conductor 650, thus holding relay 410 operated. Closure of contacts B, C and D of relay 410 will be without effect since no ground is yet supplied over conductor 552. The circuits through the contacts B, C, D of relay 410 will therefore be described later.

Operation of relay 405 closes a circuit from battery through the winding and locking contacts A of relay 405 and winding of relay 405' to grounded bus conductor 650. Relay 405' however does not yet operate since its winding is short circuited by the contacts of relay 404.

Brush arm 260 now leaves segment 265, opening the circuit through the winding of relay 404 and releasing that relay, contacts A of which open, removing the short circuit from the winding of relay 405'. Relay 405' now operates.

The opening of contacts A of relay 405' assures that its winding will not be grounded out when relay 404 again operates. Closure of contacts B prepares a circuit for operation of relay 406. Closure of contacts C of relay 405' completes a circuit from battery through the winding of relay 402, conductor 463, contacts C of relay 405' to ground. Relay 402 operates.

Now the next price signal is received, again closing a circuit to relay 404. The circuit now, however, runs from battery through brush 260, segment 264, permutation unit (as before, since the signal is again "1"), conductor Q, contact I of relay 401, conductor 460, contact I' relay 402, conductor 464, contact I' relay 403, conductor 465, upper or operating winding of relay 420, conductor 450, winding of relay 404, contacts B of relay 407 to grounded bus conductor 650. Relays 404 and 420 now operate and relay 420 locks over its locking winding and locking contacts A and conductor 462 to grounded bus conductor 650.

Operation of relay 404 completes a circuit from battery through the winding of relay 406, contacts A relay 406', contacts B relay 405' and contacts A of relay 404 to ground. Relay 406 operates preparing a circuit from battery through its own winding and locking contacts A, and the winding of relay 406' to grounded conductor 650. A circuit is also closed from conductor 552 through contacts B of relay 406 but this is ineffective at this time since conductor 552 is still open at contacts B of relay 503.

Brush arm 260 leaves segment 265 opening the circuit through relay 404, allowing its contacts A to open and remove the short circuit from the winding of relay 406'. Relay 406' operates opening the circuit from winding of relay 406, thus assuring that relay 406' will not be shorted out when relay 404 again energizes. A circuit is closed through contact B of relay 406' in order to subsequently operate relay 407 as will be described. Also a circuit is completed from battery through the winding of relay 403, conductor 466, contacts C of relay 406' to ground.

Relay 403 operates moving its armatures to the right hand contacts.

The next signal set up on the permutation unit is that for zero. Consequently, a circuit is completed through the contact P of the permutation unit relay 274 through conductor P, contacts O of relay 401, conductor 467, contact O' of relay 402, conductor 468, contact O" relay 403, conductor 469, upper or operating winding of relay 439, conductor 450 and winding of relay 404 to grounded conductor 650.

Relay 404 again operates, this time in series with relay 439. In a manner similar to that of relays 410 and 420, relay 439 locks in its operated position. Also operation of relay 404 causes relay 407 to operate due to completion of a circuit from battery through the winding of relay 407, contacts A of relay 407', contacts B of relay 406', contacts B of relay 405' and contacts A of relay 404 to ground.

When brush arm 260 again leaves segment 265, relay 404 deenergizes and relay 407' operates. This operation of relay 407' is caused by removal of the short circuit placed on its winding when relay 407 operates. The operation of relay 407' opens at its B contacts the circuit of the price circuit pulsing relay 404, thus insuring that this relay will not be operated further during this price selection.

The fractions selection is now set up in the permutation unit. Consequently, when brush arm 260 again reaches segment 264 a circuit is completed from battery through the common ring 261, brush arm 260, segment 264, conductor 241, contacts of the permutation unit relays, conductor V, contact ⅜ of relay 501 (now operated), conductor 554, upper or operating winding of relay 506, common conductor 555, conductor 550 and winding of relay 502 to ground.

Relays 502 and 506 now operate, relay 506 locking in its operated position over a circuit similar to those described in connection with the locking of relays 410, 420 and 439.

Closure of contacts A of relay 502 completes a circuit from battery through the winding of relay 503, contacts A of relay 503' and contacts A relay 502 to ground.

Relay 503 operates removing ground from contacts C and conductor 551. Due to this removal of ground from conductor 551, relay 605 deenergizes as does relay 604. Relay 604 releases and removes the ground from the operating windings of stock relay 801 and from the transfer relays 401 and 501, thus restoring the circuits to normal position for a new stock selection, and also placing ground from contacts E of relay 604 on conductor 852 to retain the selected stock relay 801 operated due to current through its locking contacts L and operating winding. Contact C of relay 604 also restores ground thru conductor 354 to the locking contacts of the stock selection relays and counting relays 305–307' thus preparing these relays for a new stock selection. Shortly after the release of relay 604 relay 605 releases. (Relay 605 is connected in series with relay 604 but is slow releasing and consequently its release is retarded). Because of this difference in release time the ground circuit over conductor 852 remains intact while relays 604 and 605 release. Release of relay 605 restores ground to the winding of relay 304 through conductor 653 so that it may operate during a subsequent stock selection, which may proceed at the same time as the posting of the selected price. Thus "overlap" is provided.

Operation of relay 503 as mentioned also applies ground to a number of circuits completed by the operation of the stock relay 801 and the price selection relays 410, 420, 439 and 506.

These circuits are:

1. From battery through the winding of register clutch magnet 810, conductor 853, contacts A of stock relay 801, conductor 854, contacts B of unoperated relay 714 to conductor 452 which is now grounded. The ground to conductor 452 is supplied from contacts B of relay 503, conductor 552, contacts B of relay 405, contacts B of relay 406 and contacts B of relay 407.

2. From battery through the winding of register clutch magnet 811, conductor 855, contacts B of stock relay 801, conductor 856, contacts B of relay 718 to grounded conductor 453. Conductor 453 is grounded over a circuit comprising contacts B of relay 503, conductor 552, contacts B of relay 405 and contacts B of relay 406.

3. From battery thru the winding of register magnet 812, conductor 857, contacts C of stock relay 801, conductor 858, contacts B of relay 722 to conductor 454 which is grounded over a circuit comprising contacts B relay 503, conductor 552 and contacts B of relay 405.

4. From battery thru the winding of register clutch magnet 813, conductor 859, contacts D of stock relay 801, conductor 860, contacts B of relay 726 to conductor 552'. Conductor 552' is grounded directly at contacts B of relay 503.

5. From battery through the winding of low shelf tens register clutch magnet 814, conductor 861, contacts F of relay 801, conductor 851, contacts B relay 601 (operated as stated), conductor 659, contacts B of relay 718 to grounded conductor 453.

6. From battery through the winding of low shelf units register clutch magnet 815, conductor 862, contacts G of relay 801, conductor 863, contacts C of relay 601, conductor 658, contacts B of relay 722 to grounded conductor 454.

7. From battery through the winding of low shelf fraction register clutch magnet 816, conductor 864, contacts H of relay 801, conductor 865, contacts D of relay 601, conductor 657 and contacts B of relay 726 to grounded conductor 552'.

Due to the completion and grounding of these seven circuits the register clutch magnets of the current and low shelves are operated and pull the register drums downward so that the drums may be driven by the shafts. Shaft 730 is the main drive shaft and is driven by motor 731 which rotates constantly and always in the same direction. Each shaft 732, 733, 734, and 735 is driven by the main shaft through a pair of bevel gears. All the hundreds digit register drums as 820 are arranged to be driven by shaft 732, all tens digit registers by shaft 733, all units digit register drums by shaft 734 and all fractions register drums by shaft 735. As soon as the tooth on the associated shaft makes contact with the tooth on the drum the drum starts to revolve.

Operation of relay 503 and consequent grounding of conductors 452, 453, 454 and 552' causes a flow of current through the following circuits:

1. From battery through the left hand winding of relay 609, conductor 754, contacts A of relay 714 to grounded conductor 452.

2. From battery through the right hand winding of relay 609, conductor 755, contacts A of relay 718 to grounded conductor 453.

3. From battery through the left hand winding of relay 610, conductor 756 and contacts A of relay 722 to grounded conductor 454.

4. From battery through the right hand winding of relay 610, conductor 757 and contacts A of relay 726 to grounded conductor 552'.

Relays 609 and 610 now operate and establish, thru their respective contacts A, two shunt circuits around the contacts A of relay 608 to retain ground on conductor 650. Operation of relays 609 and 610 also completes a circuit from battery through the windings of relay 608 and contacts B relays 609 and 610 to ground, but operation of relay 608 is without effect since the ground has been continued as before mentioned.

In addition, the operation of relay 503 extends ground to the selected commutator segments over the following circuits:

1. From grounded conductor 452 over conductor 455, contacts B of relay 410 (the only operated relay of the hundreds group), conductor 470 to segment A of hundreds digit commutator 710.

2. From grounded conductor 452 over contacts E of relay 407, conductor 456, contacts B of relay 420 (the only operated relay of the tens digit group), conductor 471 to segment A of the tens digit commutator 711.

3. From grounded conductor 452 over conductor 455, contacts B of relay 439 (the only operated relay of the units digit group) and conductor 472 to segments J of the units digit commutator 712.

4. From grounded conductor 552' over conductor 553, contacts B of relay 506 (the only operated relay of the fractions group), and conductor 556 to segment C of the fractions commutator.

Since the shafts 732, 733, 734 and 735 are constantly rotating, it is obvious that the commutator brush arms associated therewith may be passing over any segment when relay 503 operates. Also it is possible that the register drums may have been in any position (the position of course which was assumed by them when the preceding quotation for the particular stock was posted). In order that the description of the operation may be clear, assume that relay 503 operates at a time when brush arm N of fractions commutator 713 is passing over segment C and the brush arm N of commutators 710, 711 and 712 are also passing over segments C. Assume also that the preceding quotation set up on the registers of the current shelf is 111⅛ while the display on the low shelf is 110⅞.

Under these conditions a circuit will be completed from battery through contacts B of relay 729, conductor 753, common ring M of fractions commutator 713 to grounded segment C of that commutator. As the other terminal of the winding of relay 729 is grounded through conductor 552 this circuit shorts out the winding of relay 729, preventing its operation until brush arm N of commutator 713 leaves grounded segment C.

The purpose of this is to make it impossible for relay 726 to deenergize and release before the shaft has made at least one revolution. If this were not done the register drum might be revolved slightly less than a revolution and show an incorrect numeral.

Since segments C of the other commutators are not grounded, the windings of relays 717, 721 and 725 are not short circuited and these relays will operate as soon as relay 503 is operated. These relays operate over circuits from battery through their windings to grounded conductors 452, 453 and 454. Also as soon as brush arm N leaves segment C of commutator 713, relay 729 operates.

The previous display on the low shelf was 110⅞, consequently the tooth of the tens digit register drum 824 of this shelf is in the position corresponding to the position of segment A of the associated commutator 711, (because as before stated each commutator brush arm revolves in phase with the teeth on the associated shaft). The tooth on the units digit register drum is in a position corresponding to the position of segment J and similarly the tooth of fractions register drum is in a position corresponding to segment G of the commutator 713.

Also since the previous display on the last shelf was 111⅛ the tooth on the hundreds digit register drum 820 is in a position corresponding to the position of segment A of commutator 710, tooth on tens register drum 821 corresponds to segment A of commutator 711, the tooth on units register drum 822 corresponds to segment A of commutator 712 and the tooth on fraction drum 823 is in a position corresponding to segment A of commutator 713.

The tooth on register drum 823 is, however, not yet driven by the corresponding tooth on shaft 735 since the register clutch magnet is somewhat sluggish in operation, and thus when the drum reaches the lower position the tooth on the shaft has passed by.

When the tooth on the shaft 735 associated with drum 826 reaches a position corresponding to segment G it meets the tooth of drum 826 and drives that drum forward.

Next, the tooth on shaft 734 reaches position J at which position it comes into contact with the tooth on register drum 825 and drives that drum forward. At this time, a circuit is completed from battery through the winding of relay 723, contacts A of relay 724, contacts A of relay 725, conductor 752, common ring M of commutator 712 and brush arm N of that commutator to grounded segment J. Relay 723 now operates, closing its contacts A. This, however, is ineffective since the circuits through the winding of relay 724 thus completed is shunted by the low resistance circuits to grounded segment J.

The various brush arms now move to segments A. When brush arm N of commutator 711 leaves segment J, the short circuit is removed from the winding of relay 724 and that relay operates over a circuit from battery through the winding and locking contacts A of relay 723 and winding of relay 724 to grounded conductor 454. Relays 724 and 723 are thus locked in their operated positions.

The shaft teeth have now reached positions corresponding to segments A of the commutators. At this time the tooth on shaft 735 associated with register drum 823 comes into contact with the tooth on that drum and it commences to revolve. Also the tooth on shaft 734 associated with drum 822 comes into contact with the tooth on that drum and drives it forward. The teeth on shaft 733 are associated with drums 824 and 821 and drive those two drums forward while the tooth on shaft 732 associated with drum 820 drives that register drum forward.

At this time circuits are completed: from battery through the winding of relay 719, contacts A relay 720, contacts A of relay 721, conductors 751, common ring M of tens digits commutator 711, and brush arm N of that commutator to grounded segment A; from battery through the winding of relay 715, contacts A of relay 716, contacts A of relay 717, conductor 750, common ring M of hundreds digit commutator 710 and brush arm N of that commutator to ground at segment A.

Relays 719 and 715 now operate and when the associated brush arms leave segments A, the direct ground is removed and relays 720 and 716 operate over circuits similar to those described in connection with the operation of relay 724.

Shortly afterwards, brush arm N of commutator 713 reaches segment C and a circuit is completed to operate relay 727. This circuit includes battery, winding of relay 727, contacts A of relay 728, contacts A of relay 729, conductor 753, common ring M of commutator 713, brush arm N and grounded segment C of that commutator. Relay 727 operates and when the brush arm leaves segment C, relay 728 operates in series with relay 727.

When brush arm N of commutator 712 again reaches segment J a circuit is completed from battery through the winding of relay 722, contacts B of relay 724, contacts A of relay 725, conductor 752, common ring M and brush arm N of commutator 712 to grounded segment J. Relay 722 operates. Opening of contacts A of relay 722 breaks the circuit through the left hand winding of relay 610 but without effect, since current through the right hand winding continues to hold that relay operated. Opening of contacts B of relay 722 removes ground from the circuit comprising register clutch magnet 815, contacts C of relay 601 and conductor 658. Register clutch magnet 815 releases and register drum 825 is driven upward by the spring against the stop in a position such that the figure 0 is displayed. Opening of contacts B of relay 722 also removes ground from the circuit including register magnet 812 and thus causes the release of register drum 822, which moves upward under tension of the spring and comes to rest with the numeral 0 displayed. Closure of contacts C of relay 722 locks that relay in its operated position over a circuit which is traced from battery through winding and locking contacts C of relay 722 to grounded conductor 454.

Now brush arm N of commutators 710 and 711 again reach segments A of the respective commutators. A circuit is thus completed from battery through the winding of relay 718, contacts B of operated relay 720, contacts A of operated relay 721, conductor 751, common ring M and brush arm N of commutator 711 to grounded segment A. This causes operation of relay 718. In a similar manner relay 714 is caused to operate. Ground is removed from register clutch magnets 811 and 814 due to opening of contacts B of relay 718 while at the same time ground is removed from register clutch magnet 810 due to opening of contact B of relay 714.

The three register drums 820, 821, 824 move upward under spring tension against the stops; these drums each display the numeral "1".

Relays 714 and 718 lock through locking circuits similar to that disclosed in connection with relay 722. Also opening of contacts A of relays 714 and 718 removes ground from the left hand and right hand windings of relay 609 respectively. Relay 609 releases but this is without effect since the circuits broken by the opening of the contacts of this relay are continued closed through corresponding contacts of relay 610.

Finally brush arm N of commutator 713 reaches grounded segment C. At this time relay 726 operates due to completion of a circuit from battery through its winding, contacts B of operated relay 728, contacts A of operated relay 729, conductor 753, common ring of commutator 713, brush arm N of that commutator to grounded segment C. Relay 726 operates closing contacts C and locks operated over the circuit from battery through its winding and locking contacts C to grounded conductor 552'. Opening of contacts B of relay 726 opens the circuit to register clutch magnets 813 and 816 which release. Register drums 823 and 826 move upward under spring action and come to rest in position corresponding to the position of the brush arm, namely, with the numeral ⅜ displayed. The combined registration of the register drums of the last shelf is now 110⅜ and that of the low shelf 10⅜. It is thought to be unnecessary to show the hundreds numeral on the low, high and close shelves since it will almost invariably be the same as that on the last shelf. The register drums of the high and open shelves have not been affected by the operations just described.

Operation of relay 726 also, due to opening of its contacts A, opens the circuit through the right hand winding of relay 610. Relay 610 consequently releases and breaks the circuit through its contacts A to the winding of relay 608. Since contacts B of relay 609 are also open, the winding of relay 608 is now open and that relay deenergized. Relay 608 however, is slow releasing and in consequence does not immediately restore.

Opening of contacts B of relay 610 opens the circuit from grounded conductor 651 to conductor 650, since this circuit is also open at contacts A of relay 609 and contacts A of relay 608.

Removal of ground from conductor 650 opens the locking (right hand) winding circuit of relay 601 which then restores to normal; removes ground from connected conductor 462 which opens the locking windings of all price selection relays restoring operated relays 419, 420, 439 and 506 to normal; removes ground from the winding of relay 503' restoring that relay as well as relay 503 to normal; removes ground from the windings of relays 407', 406', 405' restoring those relays and series connected relays 407, 406, 405 to normal.

Release of relays 405' opens the circuit through contacts C and winding of relay 402 and restores relay 402 to normal; release of relay 406' similarly restores relay 403 to normal.

Release of relay 503 and of relays 405, 406 and 407 removes ground from conductors 552 and 552', 454, 453, 452, 455, 456 and 553.

Due to removal of ground from conductor 552' relays 726, 727, 728 and 729 restore to normal; relays 722, 723, 724 and 725 restore to normal due to removal of ground from conductor 454; relays 718, 719, 720 and 721 restore to normal due to release of ground from conductor 453; while relays 714, 715, 716 and 717 restore due to removal of ground from conductor 452.

Removal of ground from conductor 553 as well as release of relay 506 as described removes ground from segment C of commutator 713; removal of ground from conductor 455 as well as restoral of relays 439 and 440 removes ground from segment J of commutator 712 and segment A of commutator 710. Also removal of ground from conductor 456 as well as restoral of relay 420 removes ground from segment A of commutator 711.

Now relay 608 restores and replaces ground on conductor 650. The price circuits are now all restored to normal awaiting another selection. Upon reception of the figure shift signal for a new stock selection relay 801 releases. Lamp 830 is also extinguished showing completion of the posting.

Since the shelf selection and release circuits

Zero Setting of Register Drums

In order that the register drums may be at their zero position at the beginning of a market day, a special tape such as shown in Fig. 1A is prepared. This tape contains the stock symbol of each stock used, indicated at 10, shown as stocks QM and MMM, respectively, reading from right to left, followed in each case by the open-figure shift signal 11 and four zero signals 12. A letter shift signal 15 is transmitted between stock quotation signals so as to return the transmitter to the proper condition for receiving the stock indicating signal. Thus as this specially prepared tape is passed through the transmitter the register drums are restored to zero group by group, since as was shown an open-figure shift signal connects all registers of a group for registration. This special tape is used whenever it is desired to reduce the readings of all the registers to zero, usually after the close of the market.

In connection with this means of automatically setting the register drums to zero it is to be noted that by using register drums with eleven spaces there would be one blank space. Then by having eleven segments for each commutator (except the fractions which would of course have nine) and adding one relay to each price selection group it is possible to use the special tape to restore the drums to blank registration rather than zero.

System of Interconnection

Figure 10:
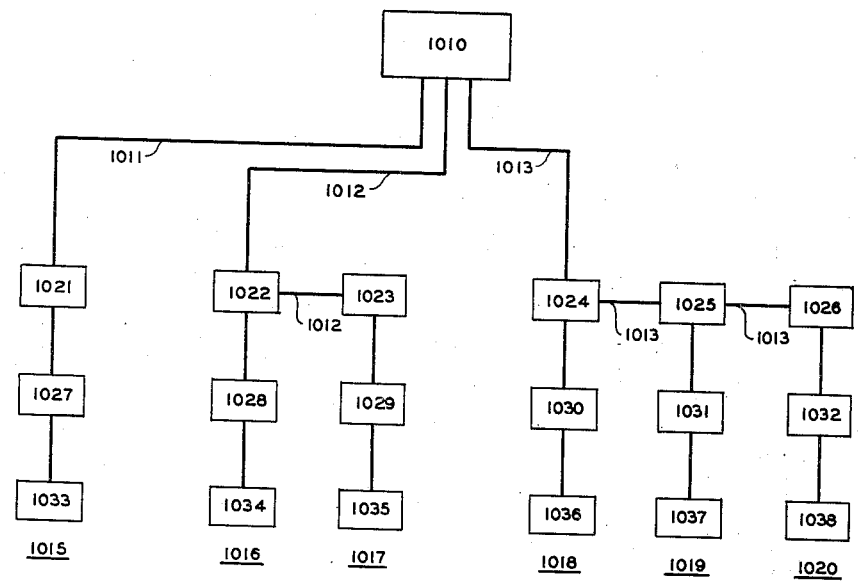
Fig. 10 is a schematic view of a layout of a stock quotation system.
Figure 11:
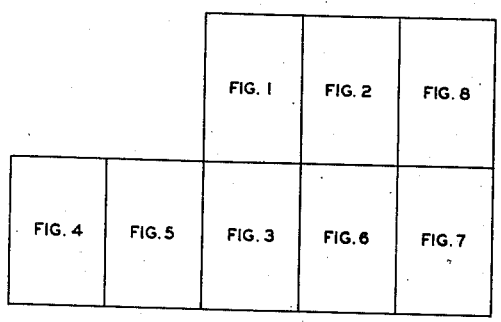
Fig. 11 shows the manner in which the various figures are assembled to form the drawing of the complete system.

Figure 10 shows the method of arranging a plurality of stock quotation boards for simultaneous operation from a single central transmitting station. In the drawings a transmitter 1010 is shown connected over a number of line wires as 1011, 1012, 1013 to a plurality of receiving stations generally denoted 1015, 1016, 1017, 1018, 1019, 1020, each of which includes a receiving distributor as 1021, 1022, 1023, 1024, 1025 and 1026, a permutation unit as 1027, 1028, 1029, 1030, 1031, 1032 and a quotation board as 1033, 1034, 1035, 1036, 1037, 1038.

The above disclosure has been given by way of preference for purposes of description only, therefore no unnecessary limitations should be understood and the appended claims should be construed as broadly as the state of the art permits.

We claim:

1. In a stock quotation system, a transmitter, a receiving relay responsive to signals from said transmitter, a first distributor associated with said receiving relay, a second distributor associated with said first distributor, a permutation unit, stock selection and stunt circuits normally associated with and price selection circuits normally disassociated from said unit, means responsive to the operation of said receiving relay for causing said distributors to operate said unit to place a predetermined stunt circuit under control of said second distributor, and means responsive to the closure of said stunt circuit by said distributor for disassociating said stock selection circuits from and associating said price selection circuits with said permutation unit.

2. In a stock quotation system, a stock quotation board having a plurality of registers for indicating respectively the hundreds, tens, units and fractions of the price, groups of hundreds, tens, units and fractions price selection relays, means for causing said hundreds group of selection relays to control the positioning of either the hundreds, tens or units registers, for causing the tens group of selection relays to control the positioning of either the tens or units registers, and for causing the units and fractions groups of selection relays to invariably control the positioning of the units and fractions registers respectively.

3. In a stock quotation system, a stock quotation board having a plurality of registers for indicating respectively the hundreds, tens and units digits of the price, the registers for indicating each order of the digits being freely mounted on separate and continuously rotating shafts, a plurality of groups of counting relays arranged in consecutive order, means for operating in consecutive order a number of said groups equal to the number of successive figure signals received, and means responsive to the operation of at least one of the first, second and third of said groups for coupling selectively said units, tens and hundreds registers, respectively, to their corresponding shafts in accordance with the figure signals received.

4. In a stock quotation system, a stock quotation board having a plurality of registers for indicating respectively the several orders of digits and the fractions of the price, the registers for indicating each order of digits and the registers for indicating the fractions being freely mounted on separate and continuously rotating shafts, a commutator associated with each shaft, price selecting means operable in accordance with received signals, means responsive to the operation of said price selecting means for locking predetermined registers to their associated shafts in definite phase relation with their associated commutators, and means controlled by said commutators for unlocking said registers from their associated shafts in accordance with the operation of said price selecting means.

5. In a stock quotation system, signal receiving means, a stock quotation board divided into units corresponding to the several stocks, each unit comprising last, low, high and open shelves, each shelf including a plurality of registers for indicating respectively the several orders of digits and the fractions of the price, price selecting circuits, a stock relay individual to each unit for associating the registers on said last shelf with said price selecting circuits and for conditioning the registers on the other shelves for association with said circuits, stock selection relays responsive to said signal receiving means for conditioning a predetermined stock relay for operation, means for operating the conditioned stock relay upon reception of a figure shift signal, means responsive to said signal receiving means for operating said price selection circuits to position predetermined registers on the last shelf of said associated unit, an auxiliary relay, individual to the operated stock relay, conditioned for operation by the actuation of the last mentioned relay, and an open shelf relay controlled by said receiving means, effective upon its operation to complete the operating circuit of said auxiliary relay, which operating circuit associates the registers of the high shelf with said price selecting circuits, said open shelf relay also operating said lower shelf relay to associate the registers on said open and low shelves with the price selecting circuits.

6. In a stock quotation system, a stock quotation board having a plurality of registers for indicating respectively the several orders of digits and the fractions of the price, separate and continuously rotating shafts on which the registers for indicating each order of digit and the registers for indicating the fractions are freely mounted, a commutator associated with each shaft and a group of counting relays associated with each commutator, register control circuits selectable in accordance with received signals for selectively clutching to their associated shafts the registers for indicating any order of digits and the registers for indicating the fractions, circuits likewise selectable in accordance with received signals for grounding a predetermined segment on each of the commutators associated with the last-mentioned shafts, and means whereby the grounded commutators cooperate with their associated counting relay groups to retain the selected registers clutched to their associated shafts until said registers have been driven through at least one revolution, and then to declutch said selected clutch registers in accordance with the ground on the respective associated commutators.

7. In a stock quotation system, the combination of a central transmitting station including an automatic tape transmitter, a receiving station provided with a quotation board comprising a plurality of register units each having a plurality of registers, means associated with said board and responsive to signals from said transmitter for selecting a register unit from the plurality of register units on said board, other means associated with said board and likewise responsive to signals from said transmitter for selecting and setting the registers in said unit, and a special tape cooperating with said transmitter, said tape containing all the necessary perforations to cause the transmission of a series of selection signals for successively selecting all the register units on said board and setting all the registers in each selected unit to zero registration.

8. In a stock quotation system, the combination according to claim 6, characterized by the provision of means for clutching each of the selected registers to its associated shaft when the wiper of the commutator associated with said shaft is in any one of a number of positions and for invariably de-clutching each selected register from its said shaft only after it has made at least one complete revolution and when the wiper of said commutator rests on a grounded segment.

9. In a stock quotation system, the combination according to claim 6, characterized by the provision of means for clutching the selected registers to their associated shafts without regard to the position of the wiper on the several commutators associated with said shafts, and for de-clutching said selected registers from their associated shafts when the wipers on the commutators associated with said shafts are all in different positions.

10. In a stock quotation system, the combination according to claim 6, characterized in this, that each counting relay group comprises four successively operated relays under control of a particular commutator and means whereby each of the first and third of said relays is operable only when the wiper of said commutator is off a grounded segment and means whereby each of the second and fourth of said relays is operated only when said wiper is on the grounded segment.

11. In a stock quotation system, the combination according to claim 6, characterized in this, that each counting relay group comprises four relays, means for causing the successive operation of said relays under control of an associated commutator and means for de-clutching the register clutched to the shaft with which said commutator is associated when the fourth counting relay in said group opens the register control circuit corresponding to said register.

12. In a stock quotation system, first, second and third groups of stock selection relays, a permutation unit normally associated with the stock selection relays of the first group, relay counting means effective upon their first and second operations to transfer said permutation unit into association with said second and third stock selection relay groups, respectively, a transmitter, a receiving relay responsive to signals from said transmitter, a first distributor associated with said receiving relay, and a second distributor associated with said first distributor, a first group of storage relays selectively operated by said first distributor in accordance with the operation of said receiving relay, said group of storage relays being selectively operated once for each stock selection signal received, a second group of storage relays selected by the operated storage relays in the first group, means whereby said second distributor operates the selected storage relays in the second group to cause the selection by said permutation unit of a predetermined stock selection relay in the associated group, releases the operated storage relays in the first group, operates said relay counting means and the stock selection relays selected by said permutation unit, and then releases the operated storage relays in the second group to restore said permutation unit to its normal condition awaiting the reception of the next stock selection signal.

13. In a stock quotation system, the combination according to claim 6, characterized by the provision of means for clutching each selected register to its associated shaft in any position of the wiper of the commutator corresponding thereto, and for de-clutching it in phase with said wiper.

14. In a stock quotation system, signal receiving means, a stock quotation board divided into units corresponding to the several stocks, each unit comprising last, low, high and open shelves, each shelf including a plurality of registers for indicating respectively the several orders of digits and the fractions of the price, price selecting circuits, a stock relay individual to each unit for associating the registers on said last shelf with said price selecting circuits and for conditioning the registers on the other shelves for association with said circuits, stock selection relays responsive to said signal receiving means for conditioning a predetermined stock relay for operation, means for operating the conditioned stock relay upon reception of a figure shift signal, means responsive to said signal receiving means for operating said price selection circuits to position predetermined registers on the last shelf of said associated unit, an auxiliary relay associated with each stock relay, a high, a low, and an open relay are common to said units, one of said stock relays cooperating with said low relay to associate the registers of the last and low shelves of the associated unit with said price selecting circuits, cooperating with said high relay and auxiliary relay to associate the registers of the last and high shelves with said price selecting circuits, and cooperating with the open relay, said low relay being operable in response to the operation of the open relay, and the auxiliary relay to associate the registers of the open, low and last shelves with said price selecting circuits.

15. In a stock quotation system, a plurality of groups of stock selection circuits, a permutation unit normally associated with a first group of said circuits, for selectively closing one of the stock selection circuits in the group associated therewith, a plurality of transfer relays, each for associating one of the remaining groups of said circuits with said permutation unit, a plurality of groups of counting relays, each group being operable to actuate one of said transfer relays, a pulsing relay responsive to successive energization for consecutively operating said groups of counting relays, a first and second distributor for jointly operating said permutation unit in accordance with received signals, said second distributor being provided with means for energizing said pulsing relay once for each of the signals received.

ALLISON A. CLOKEY.
GILBERT S. VERNAM.